Figure 1:
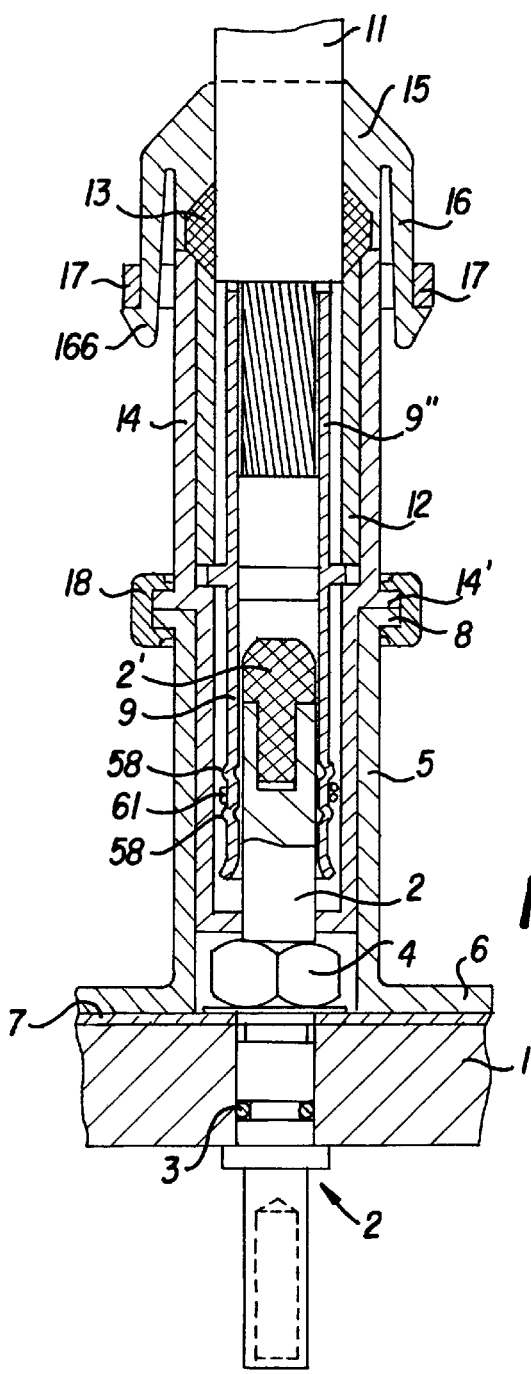

United States Patent

Gottschalk et al.

[19]

[11] Patent Number: 5,916,002
[45] Date of Patent: Jun. 29, 1999

[54] CONNECTING SYSTEM FOR ELECTRIC CONDUCTORS

[75] Inventors: Klaus Gottschalk, Kornwestheim; Paul F. Deister, Brackenheim; Hans-Joachim Keller, Geislingen-Weiler; Bernd Moser, Pforzhiem; Günther Sobieray, Gerlingen, all of Germany

[73] Assignee: Karl Pfister Elektrorechnische Spezialartikel GmbH & Co. KG, Germany

[21] Appl. No.: 08/722,125

[22] PCT Filed: Apr. 4, 1995

[86] PCT No.: PCT/EP95/01226

§ 371 Date: Nov. 22, 1996

§ 102(e) Date: Nov. 22, 1996

[87] PCT Pub. No.: WO95/28019

PCT Pub. Date: Oct. 19, 1995

[30] Foreign Application Priority Data

Apr. 6, 1994 [DE] Germany ............... 44 11 784

[51] Int. Cl.⁶ ................................. H01R 13/15
[52] U.S. Cl. ............................................. 439/839
[58] Field of Search ................... 439/825, 839, 439/347, 345, 856, 844, 349

[56] References Cited

U.S. PATENT DOCUMENTS 4,431,256  2/1984  Piscitelli et al. .
4,666,227  5/1987  Galizia et la. .
5,024,604  6/1991  Savin et al. .............................. 439/345
5,199,910  4/1993  Kahle et al. .

FOREIGN PATENT DOCUMENTS 0 352 967  1/1990  European Pat. Off. .
  821722  12/1937  France .
2 578 362  9/1986  France .
1 490 668  4/1969  Germany .
 4135391  12/1992  Germany .

*Primary Examiner*—Steven L. Stephan
*Assistant Examiner*—Eugene G. Byrd
*Attorney, Agent, or Firm*—Blank Rome Comisky & McCauley LLP

[57] ABSTRACT

A connection system for electrical conductors, in particular insulated cables which are connected to electrical equipment, has at least one pin-and-socket connector comprising two plug-in multi-line contact elements. One contact element is designed as a pin while the other is designed as a socket. The element designed as a socket has tongues which extend in the longitudinal direction of the socket and flex in the radial direction. Each of the tongues has at least one part which extends in the longitudinal direction of the tongue and projects radially inward to make contact with a line. That part is formed by longitudinal edges of the tongues. The pin of each connection is contained in a first electrically insulated housing, and the socket of each connection is contained in a second electrically insulated housing, with the two housings adapted to plug into one another in a fluid-tight and eletrically integral fashion.

16 Claims, 17 Drawing Sheets

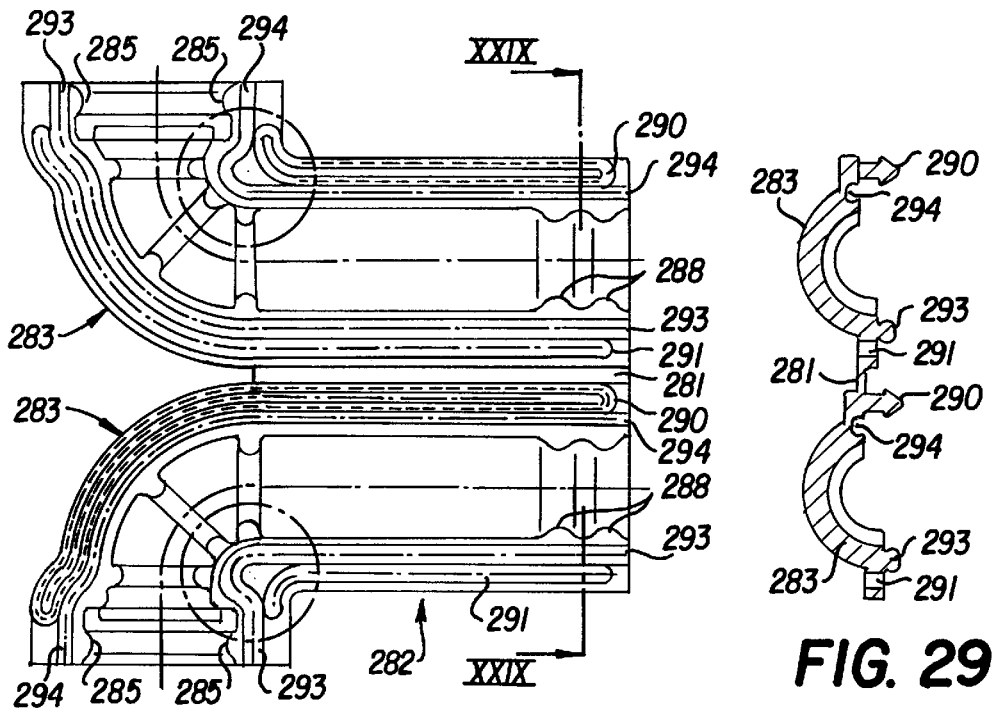
FIG. 28
FIG. 29
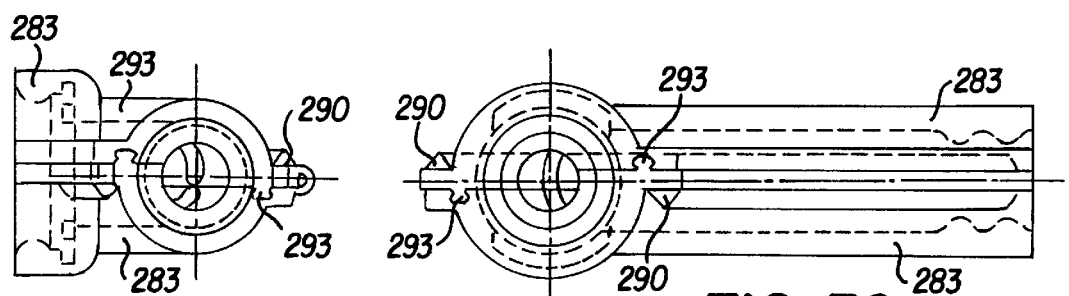
FIG. 31
FIG. 30
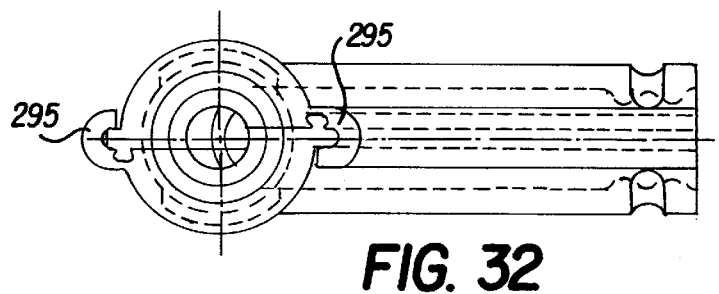
FIG. 32

FIG. 33
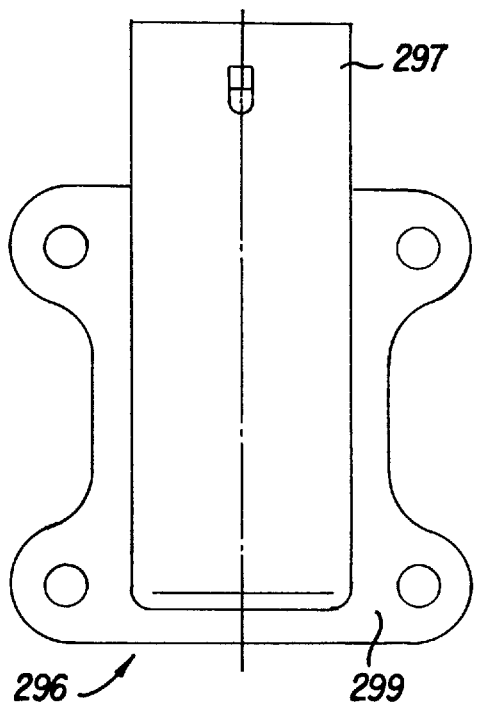
FIG. 34
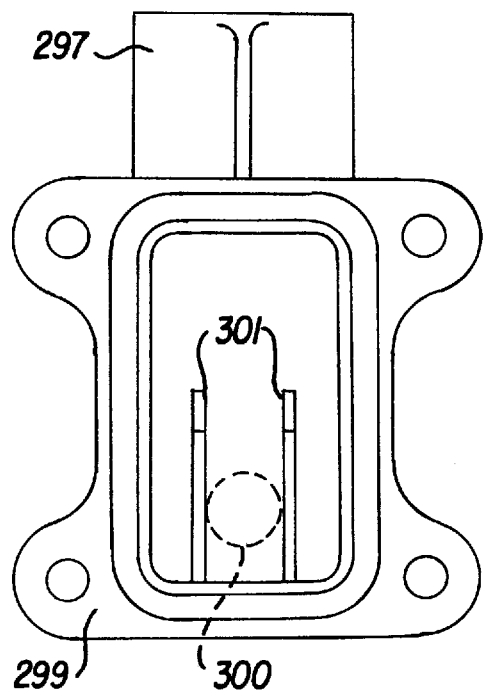
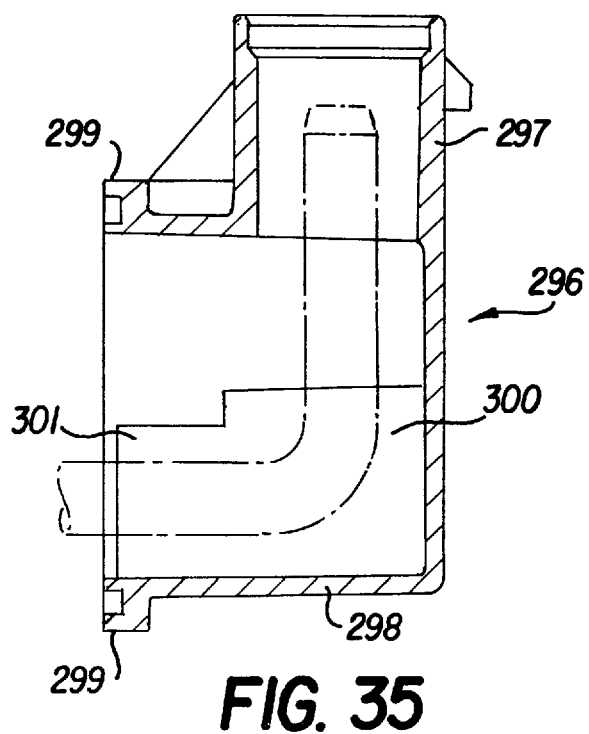
FIG. 35

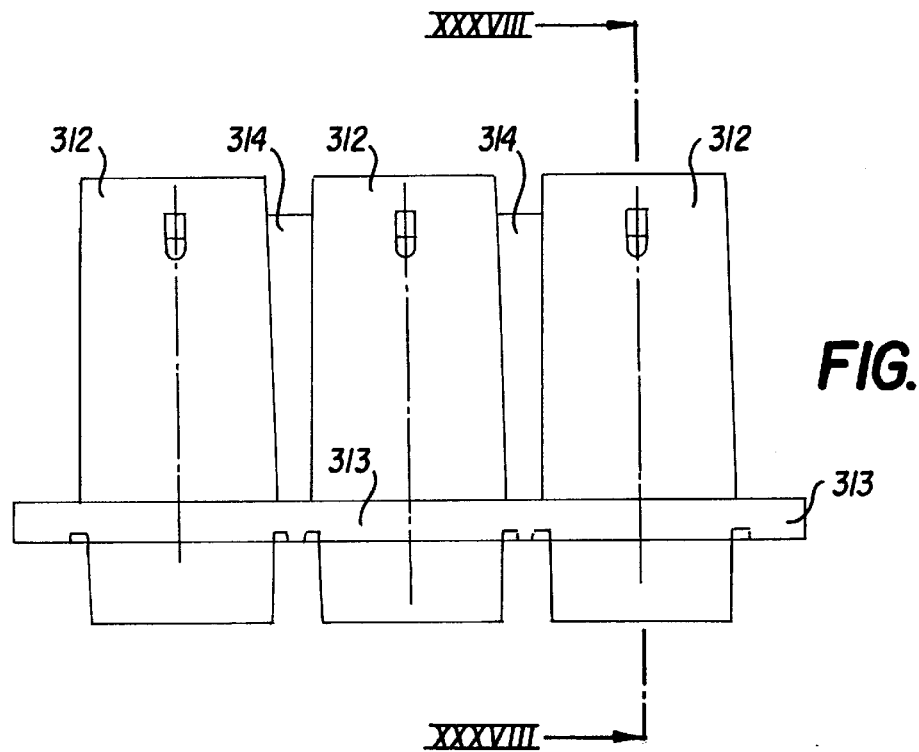
FIG. 37
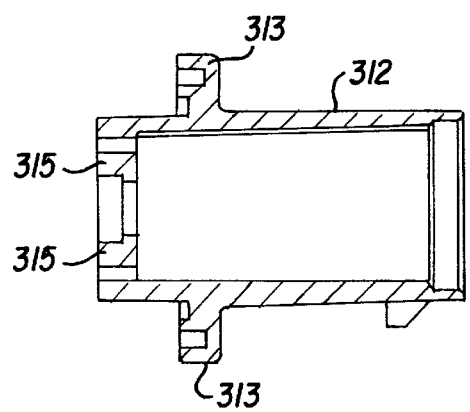
FIG. 38
FIG. 39
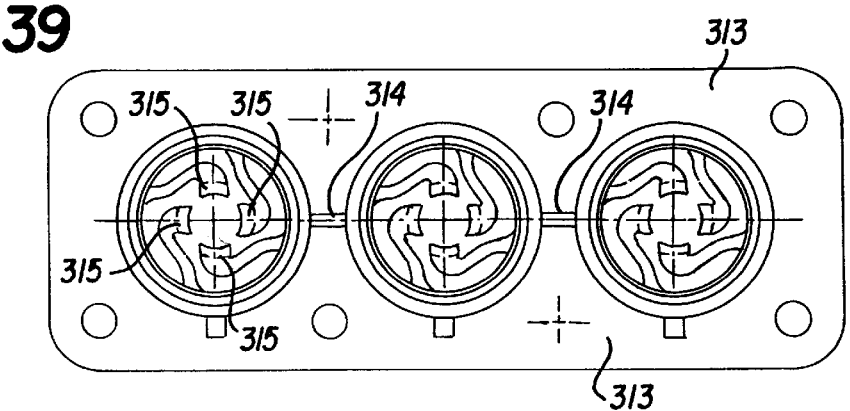

CONNECTING SYSTEM FOR ELECTRIC CONDUCTORS

The invention relates to a connecting system for electric conductors, in particular insulated cables which are to be connected to electrical equipment, which has the features of the preamble of claim 1.

A connecting system of this type has already been disclosed in U.S. Pat. No. 4,431,256. This connecting system has the disadvantage of relatively high production costs for the socket, which is constructed in the form of a slotted sleeve. There are also deficiencies in making contact securely after a large number of separations and connections.

In a known connecting system, shown in EP 0 352 967 A1, of a similar type, the current carrying capacity is deficient to the extent that the requirements which are placed on connections in mobile use, in particular in the case of the connection of cables to the, components of an electric drive for vehicles, are not fulfilled.

It is the object of the invention to provide a connecting system which is improved by comparison with these known systems and which not only is capable of transmitting high currents reliably over long periods, but can also, moreover, be produced in a cost-effective fashion. This object is achieved by means of a connecting system having the features of claim 1.

Thanks to the arrangement of a spring which is applied to the socket in the region of the tongues thereof, a line contact is ensured between the tongues and the pin to be contacted, even in the case of a socket which is formed from a stamped board having cut-out tongues. In addition to a high current carrying capacity, the solution according to the invention has the advantage of being able, by contrast with plug-and-socket connections having laminated contact elements, to compensate even large dimensional tolerances without impairing the current carrying capacity. Reliable contact-making is ensured even after a large number of separations and connections. Moreover, the production costs are extremely low because of the production of the socket with its tongues from a board, which is rolled to form a hollow cylinder after the processing, that is to say the stamping free of the tongues and the shaping thereof.

The use of a spring to increase the contact pressure in the case of an electrical connecting system is already known per se from FR-A-821 722. However, this concerns the arrangement of the spring on a socket which is constructed to be relatively solid and whose lateral surface is subdivided into contact arms by milled-in longitudinal slots.

It is preferred for there to be, integrally formed on the tongues, projections which overhang outwards and which secure against axial displacement the spring which grips the socket in the region of the tongues. This measure also contributes to keeping the costs of the contact system very low.

In a preferred embodiment, the socket is arranged in a first, and a pin is arranged in a second electrically insulating housing in a fashion safe from touch, and these two housings are plugged into one another when the plug-and-socket connection is produced. In the state in which they are plugged into one another, the two rigid housings mutually support each other, as a result of which forces acting from outside on the plug-and-socket connection are kept away from the contact system. Since, as a rule, the contact system has to be protected not only against external force influences, but also against other influences, the two housings are advantageously connected to one another in a fluid-tight fashion in the state in which they are plugged into one another. Moreover, in the case of relatively high operating voltages it is expedient also to provide an electrically tight connection between the two housings which are plugged into one another. It is then possible even with relatively small dimensions to render the connecting system usable for relatively high voltages. For example, operating voltages of up to 6 kV can be realized without difficulty. This holds, above all, when the housing containing the socket is constructed over virtually the entire length of the housing containing the pin, and to be capable of being plugged into the latter housing, in order to realize very long creepage distances, and when a seal is provided in the region of the free end of the housing surrounding the pin between the latter and the other housing.

The connecting system according to the invention is vibration-resistant, which is indispensable as a rule, above all in the case of mobile use; it is, furthermore, thermostable and chemical-resistant and fulfills at least the requirements of the IP66 degree of protection. It is therefore capable of fulfilling completely all the requirements usually occurring. Furthermore, it is very space-saving. A substantial advantage consists, finally, in that it can be produced cost-effectively. This is also aided by a modular design, by means of which the number of different individual parts is kept low.

The connecting system according to the invention comprises not only single-pole plug-and-socket connections but also multi-pole ones. In the case of polyphase systems, it will even as rule be more advantageous to provide a multi-pole plug, at least on the appliance side. However, it is also possible to use multi-pole plugs advantageously on the cable side as well. Whereas, in the case of multi-pole plugs, the mutual arrangement of the individual housings is enough to ensure that only in-phase connection is possible, coding is required for this purpose in the case of single-pole plugs. In a preferred embodiment, the housing containing the socket is therefore provided on its outside with coding, for example in the form of longitudinal grooves which must be aligned with corresponding projections of the housing of the plug in order to be able to plug the two housings into one another. A satisfactorily large number of codings can be realized with as few as two such longitudinal grooves, which are offset by different angles with respect to one another in the circumferential direction. However, it goes without saying that other coding systems also come into consideration.

The decision as to whether a cable plug has a single-pole or multi-pole design also depends on the operating force to be applied. In principle, a single-pole design requires a lesser operating force than a multi-pole design. A lesser operating force can be advantageous principally when very high requirements placed on the protection against external influences, and in particular against the intrusion of moisture, have to be fulfilled, in particular protection against hose-water or even pressurized water, because then the seals require a correspondingly higher compressive load.

The connecting system according to the invention can be designed optionally as a straight and as an angular plug-and-socket connection.

Figure 3:
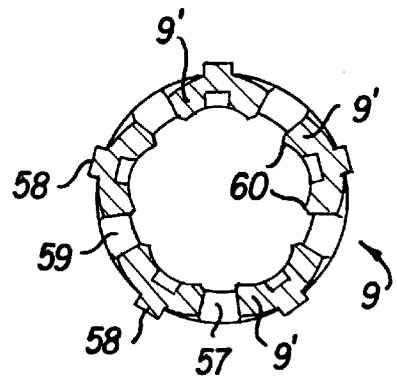
Figure 14:
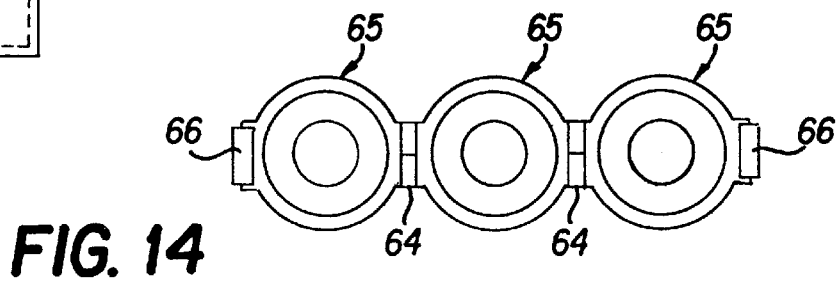
Figure 2:
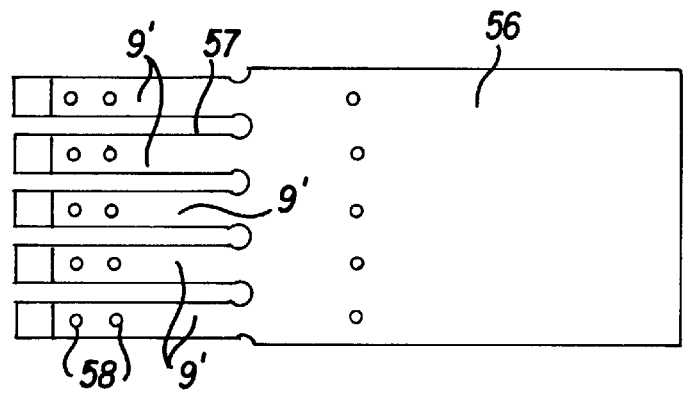
Figure 4:
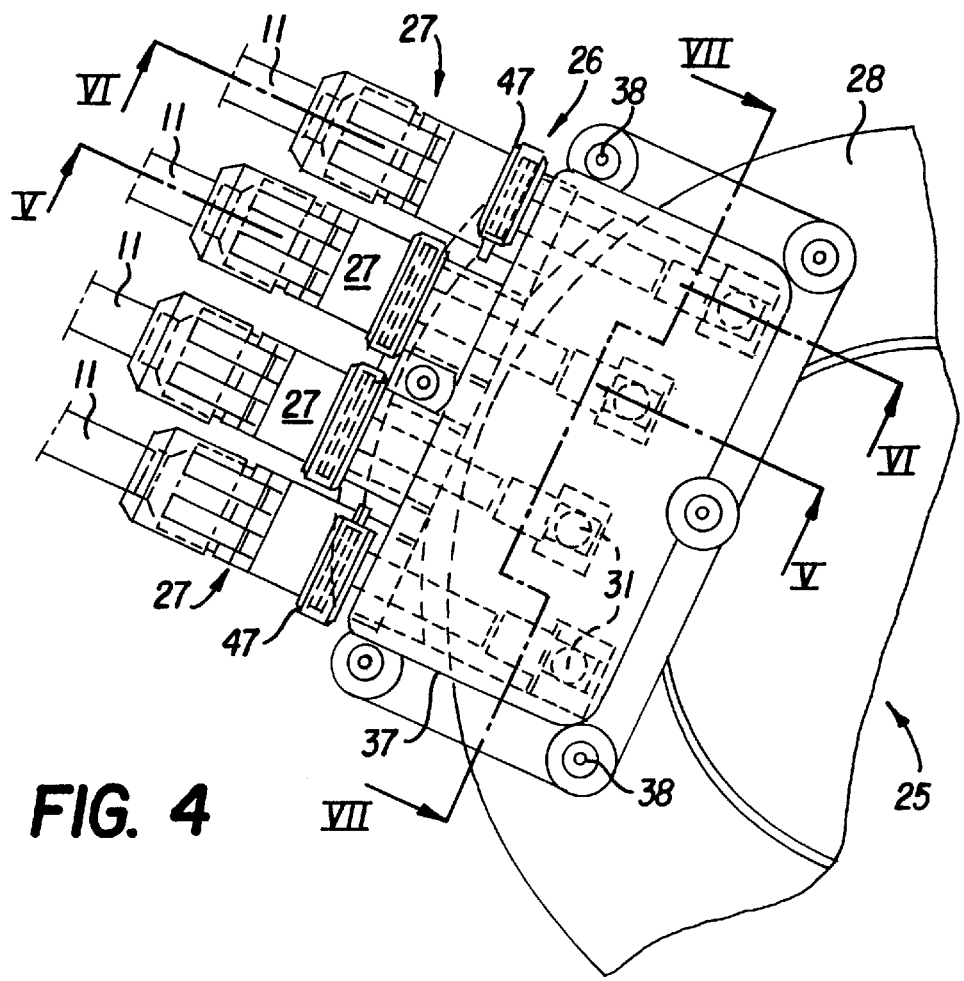
Figure 6:
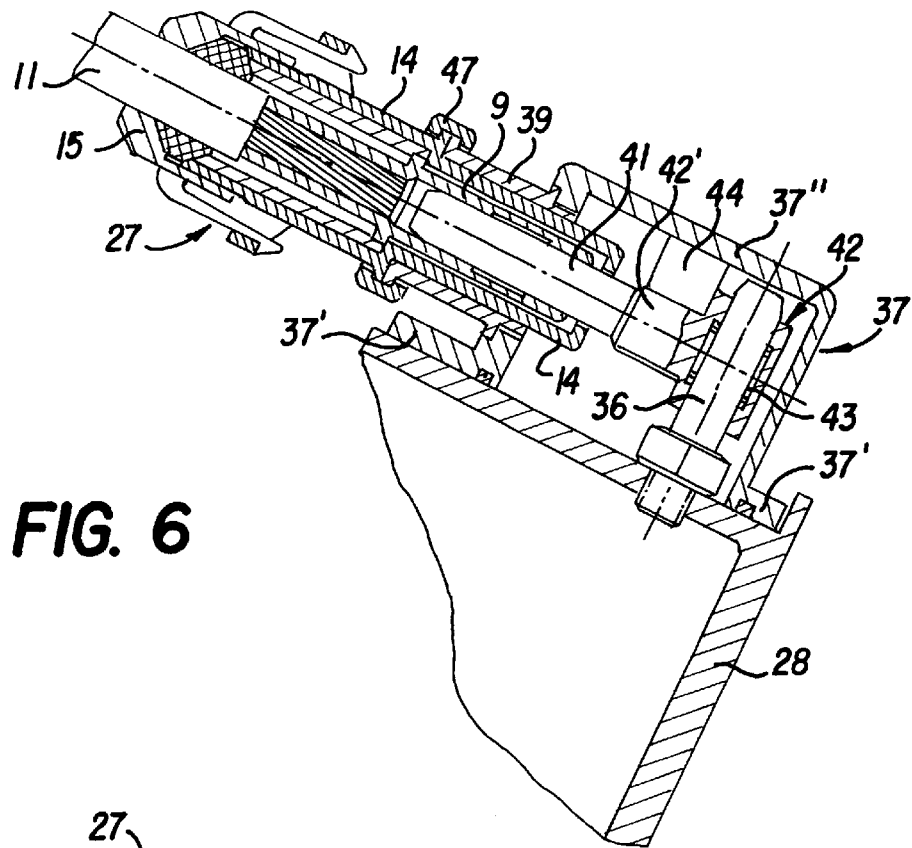
Figure 5:
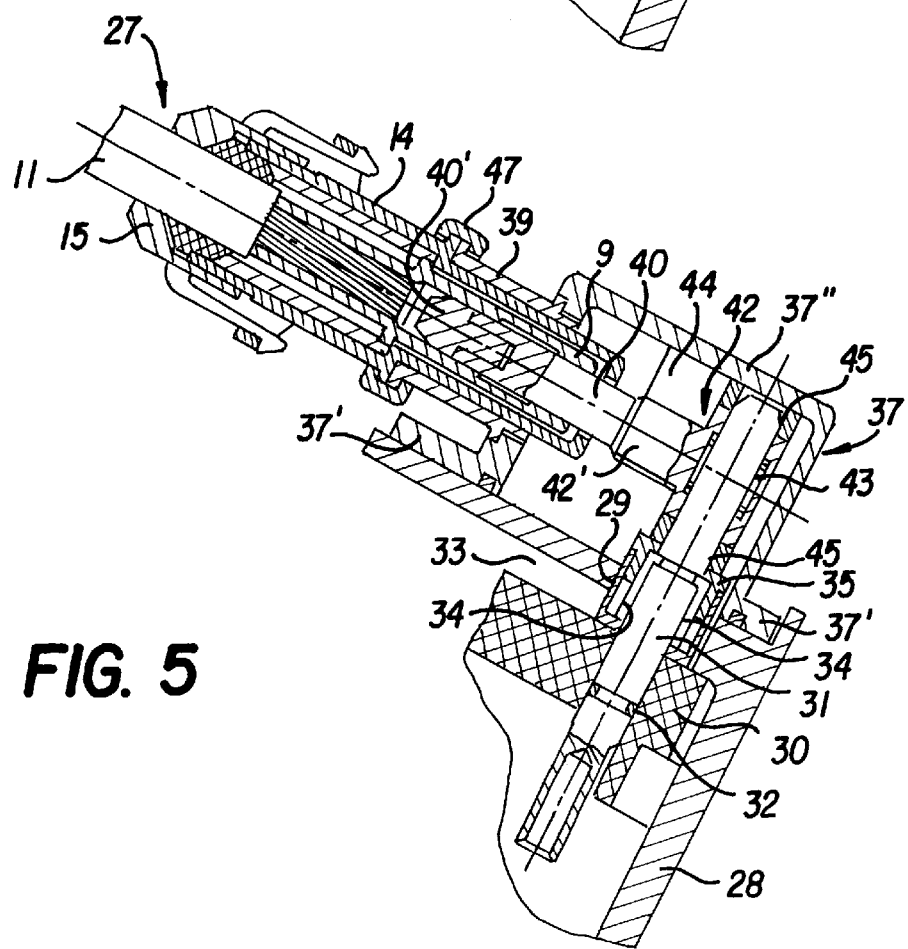
Figure 7:
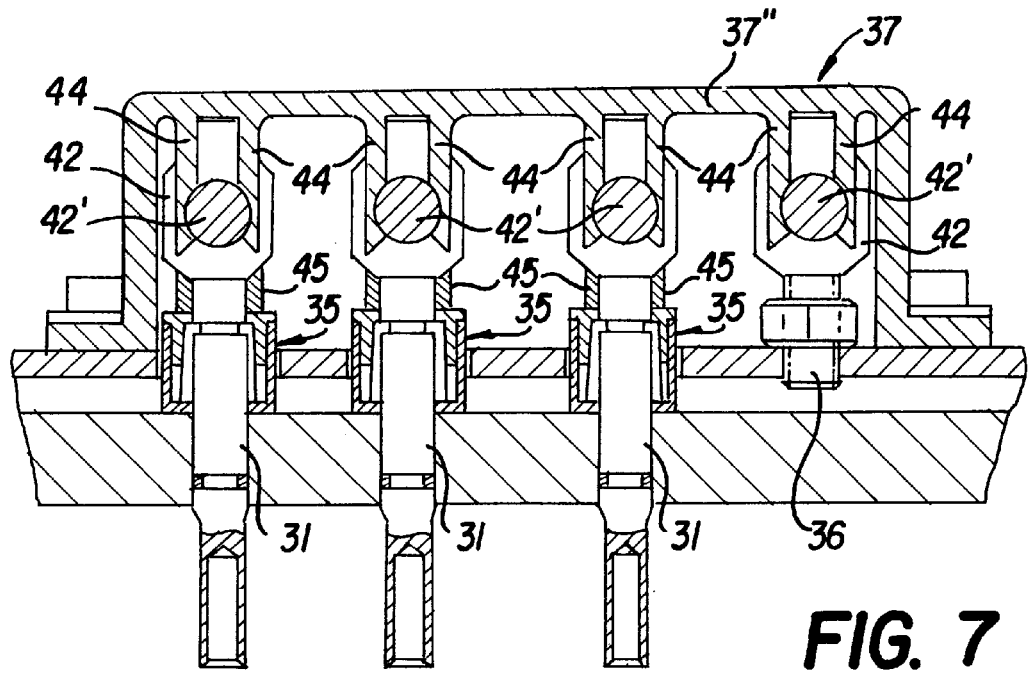
Figure 9:
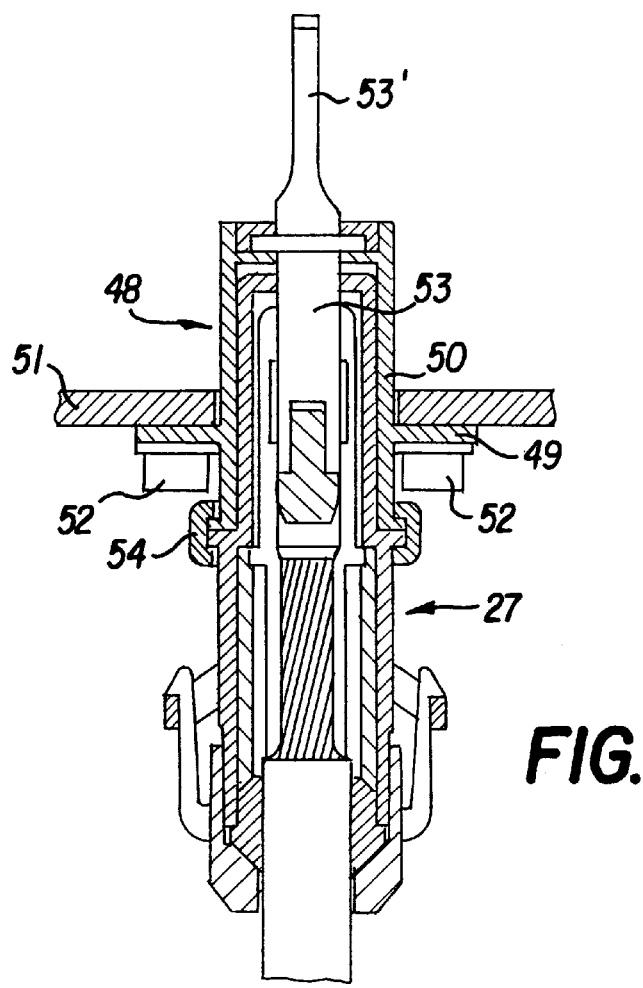
Figure 8:
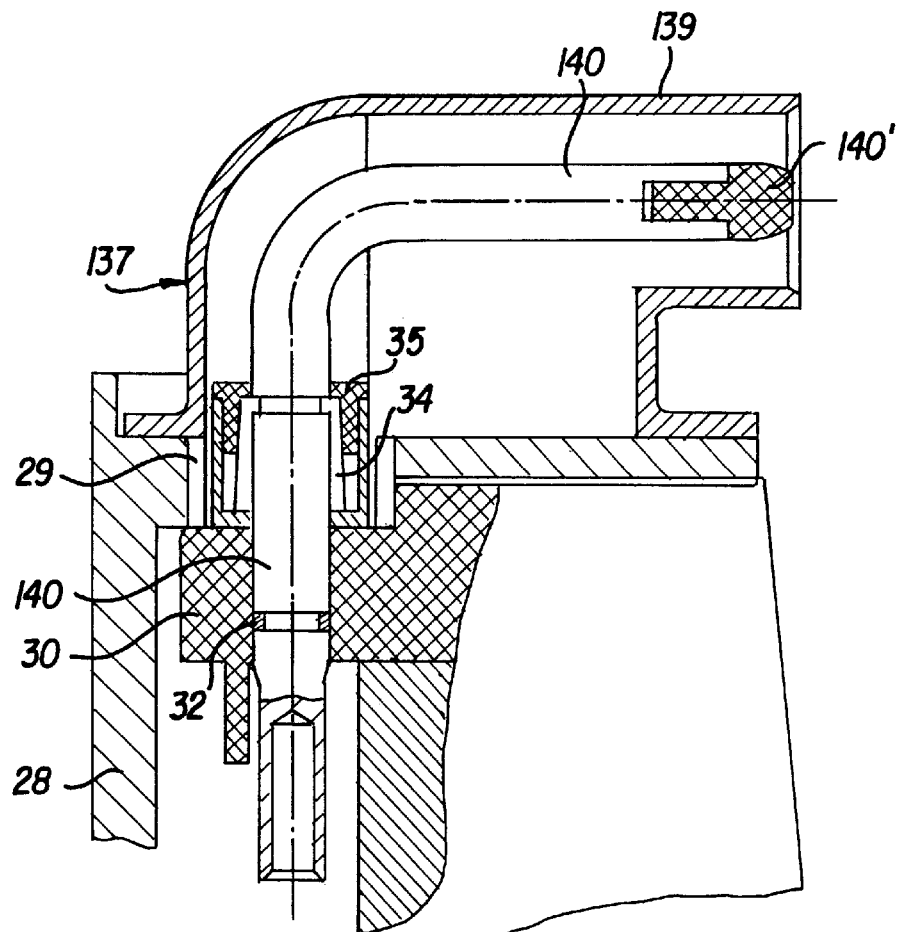
Figure 25:
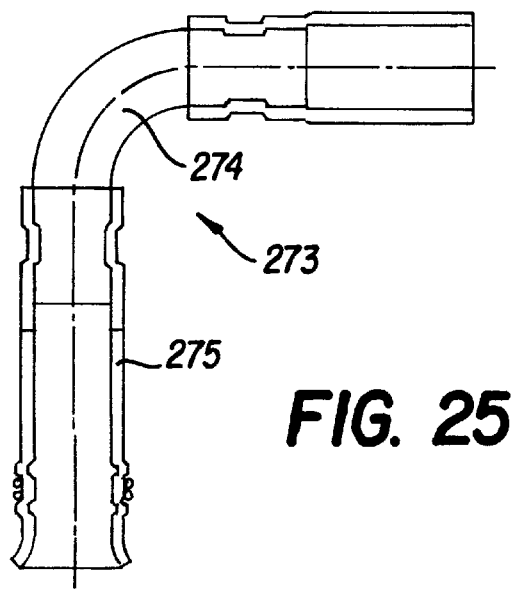
Figure 10:
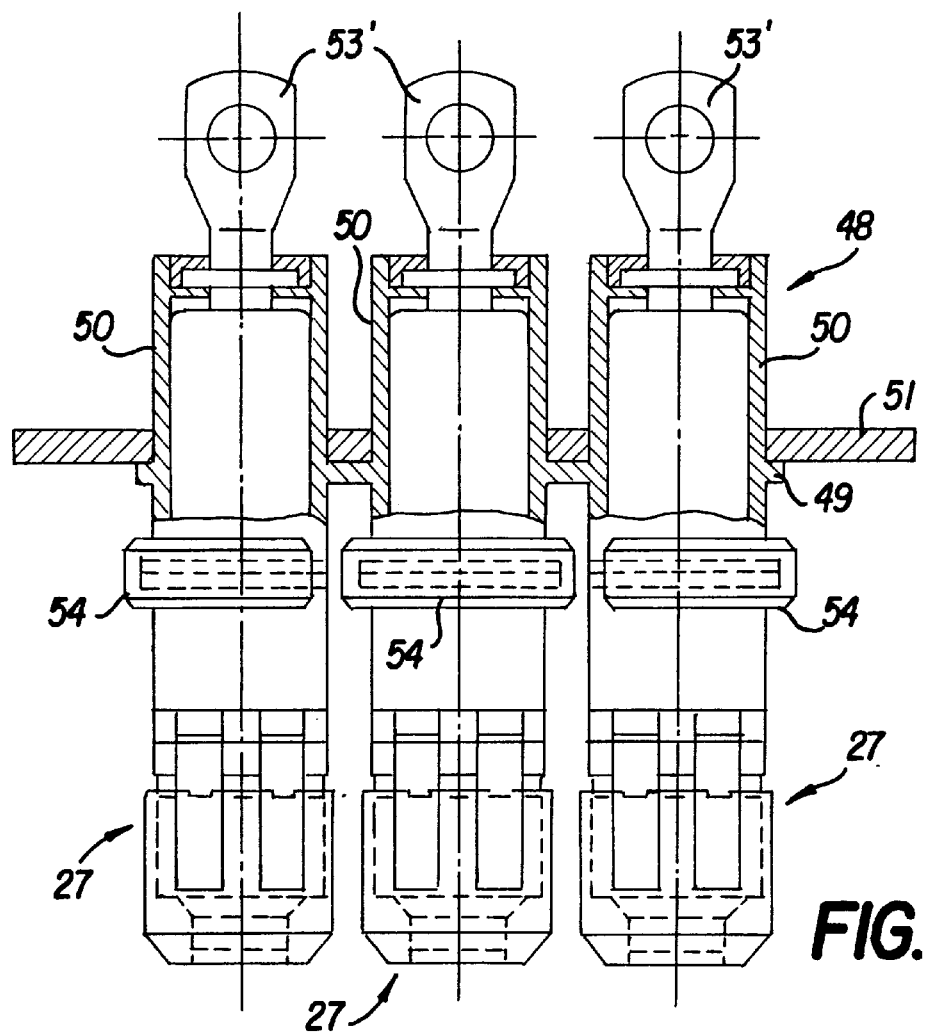
Figure 11:
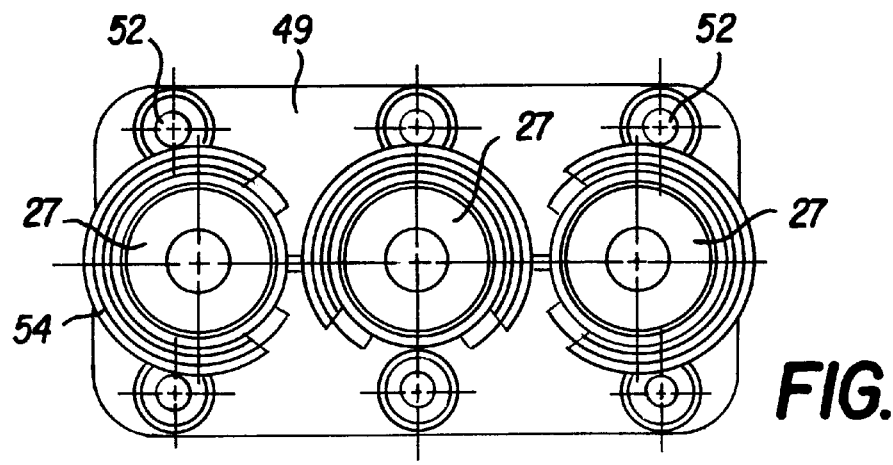
Figure 12:
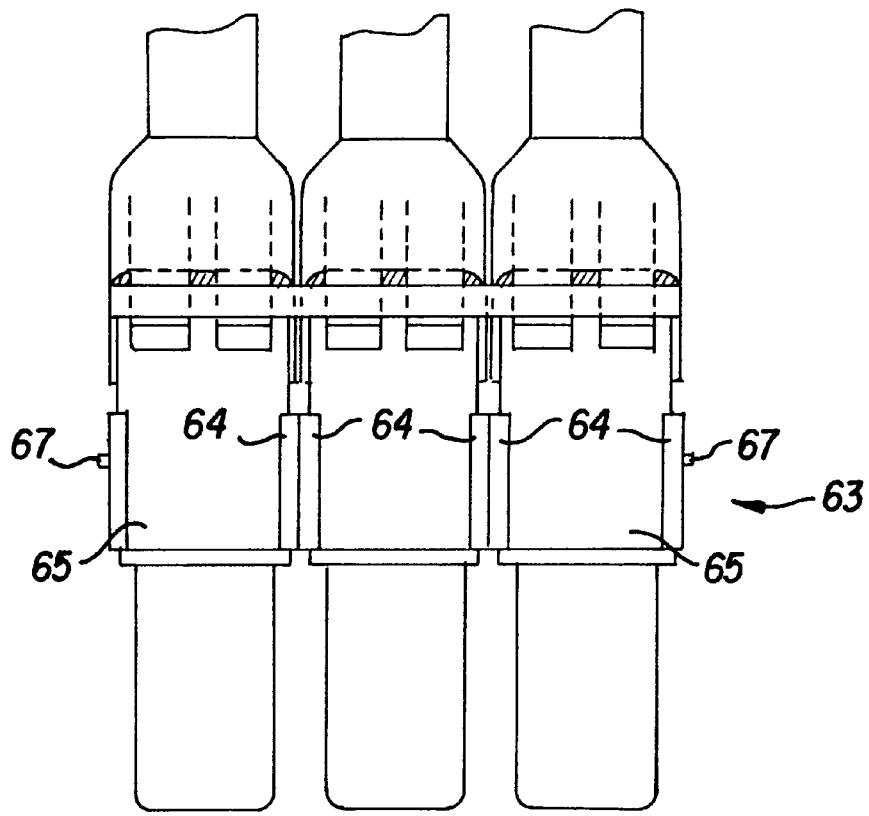
Figure 13:
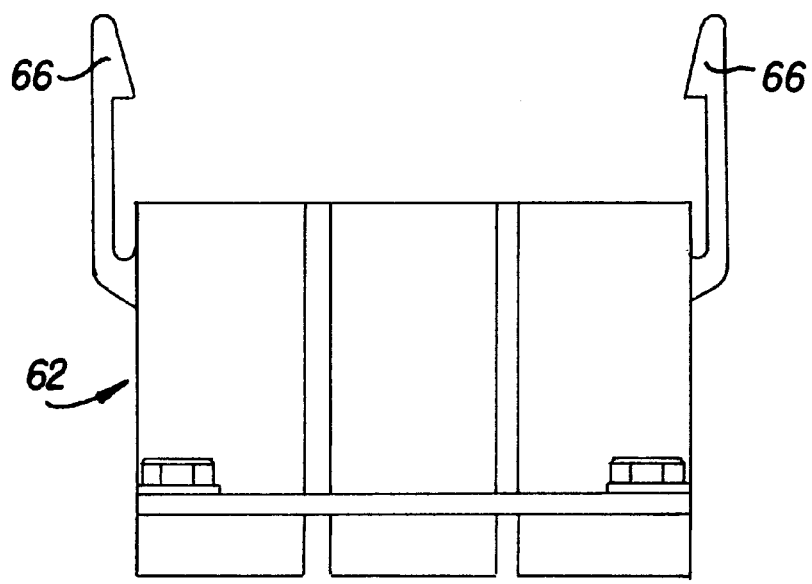
Figure 15:
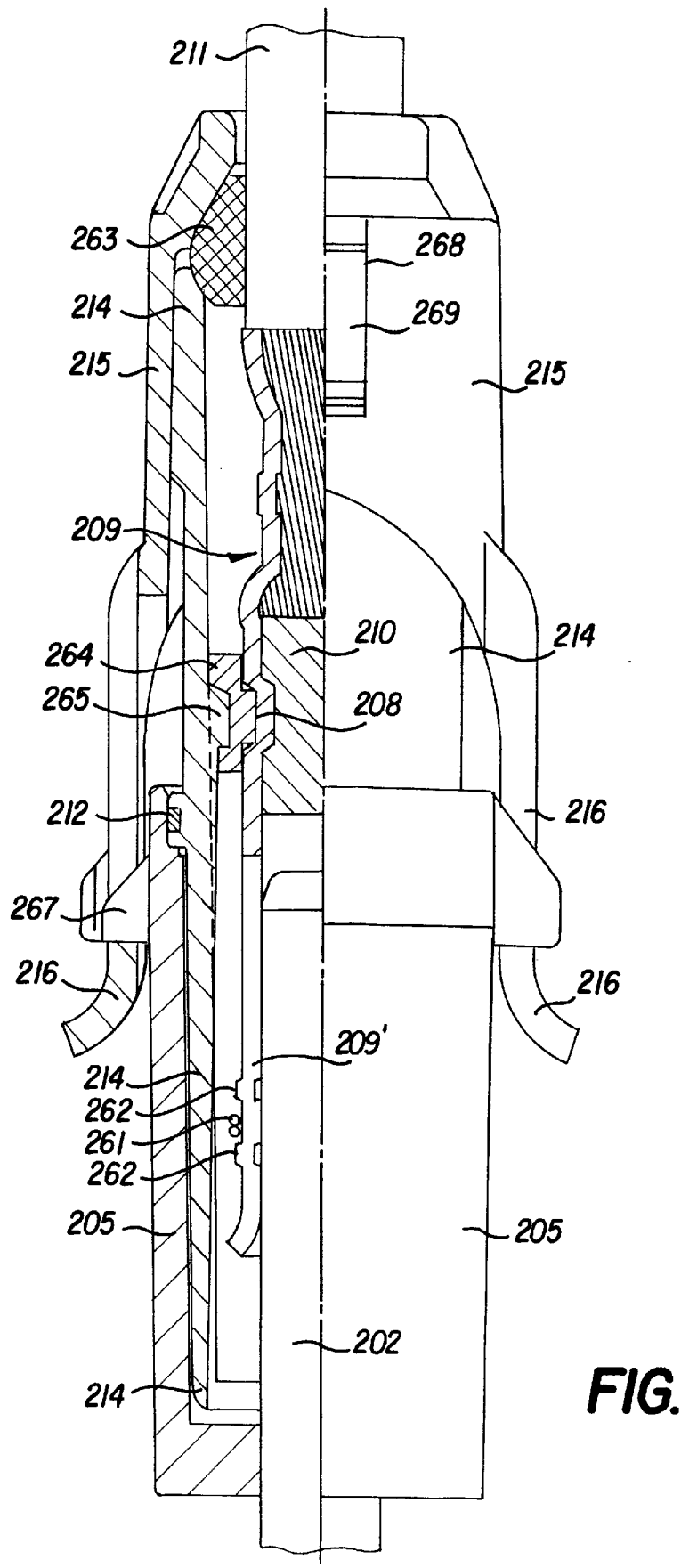
Figure 16:
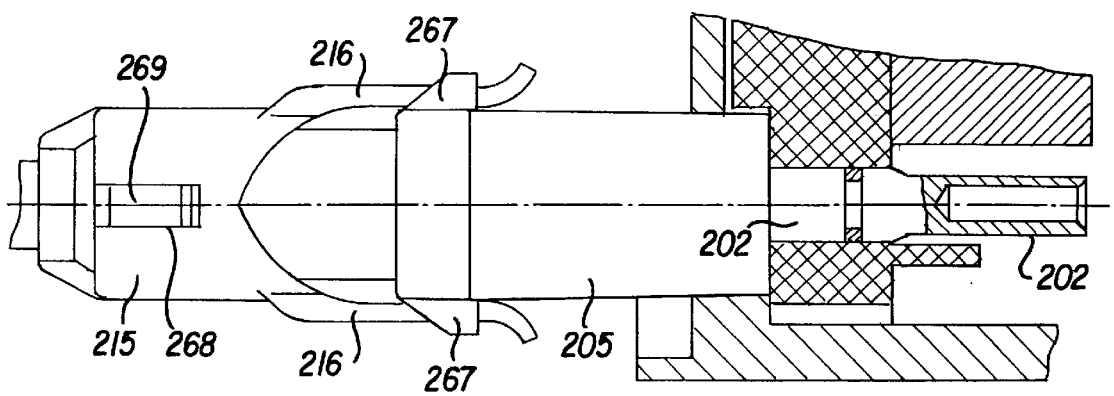
Figure 17:
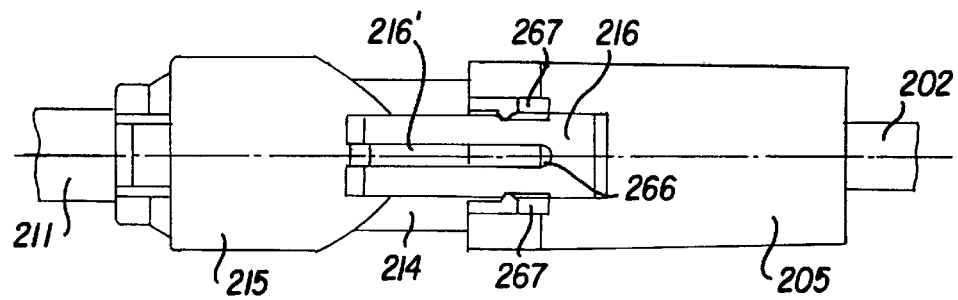
Figure 18:
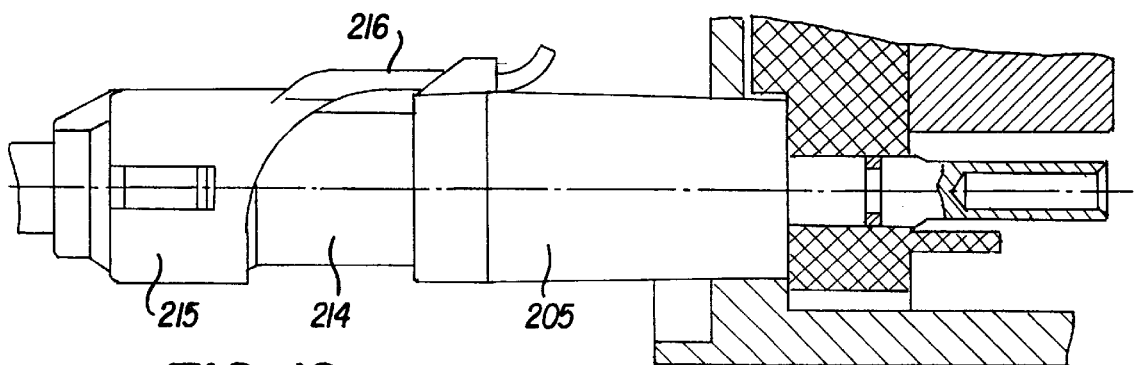
Figure 19:
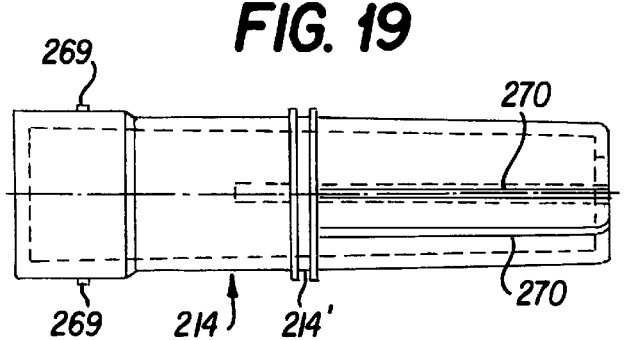
Figure 20:
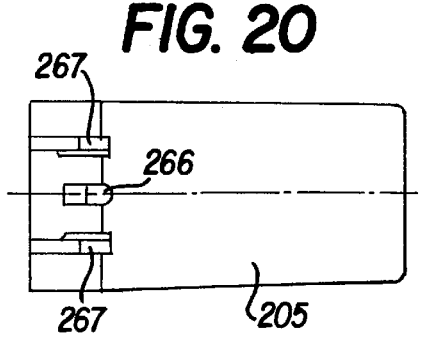
Figure 21:
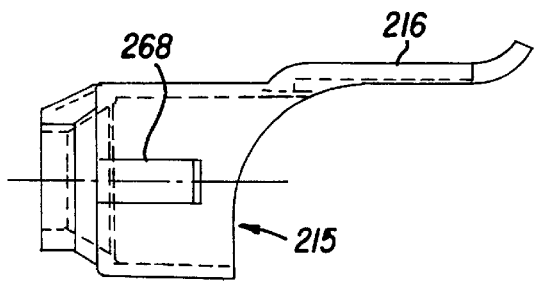
Figure 22:
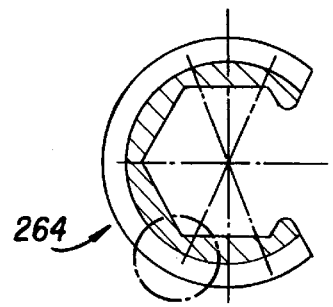
Figure 23:
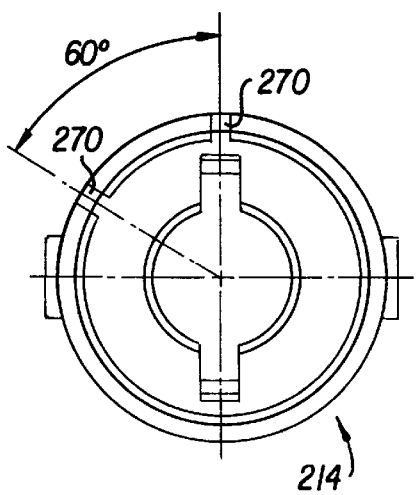
Figure 24:
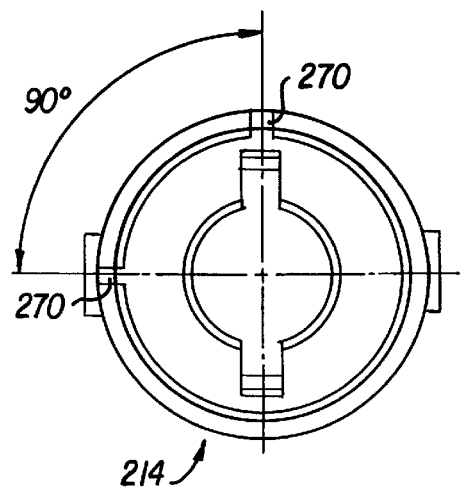
Figure 26:
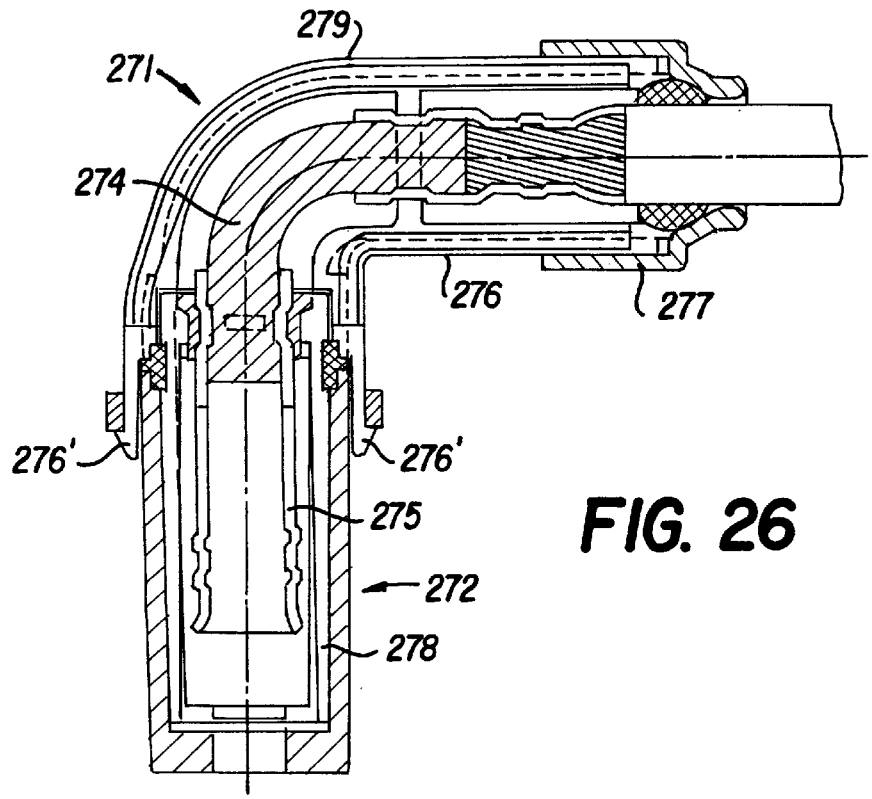
Figure 27:
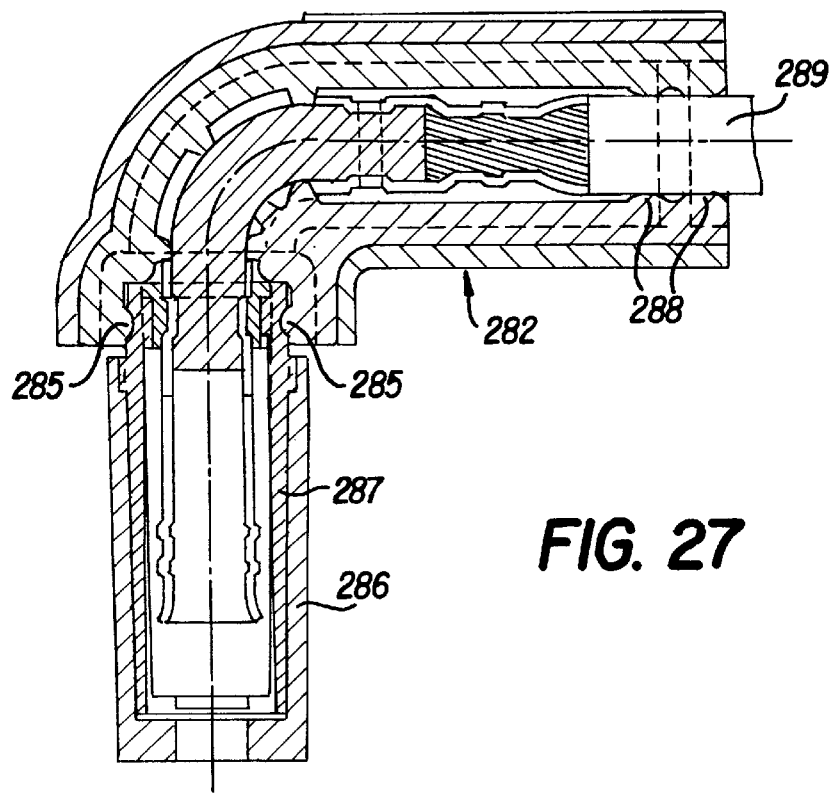
Figure 36:
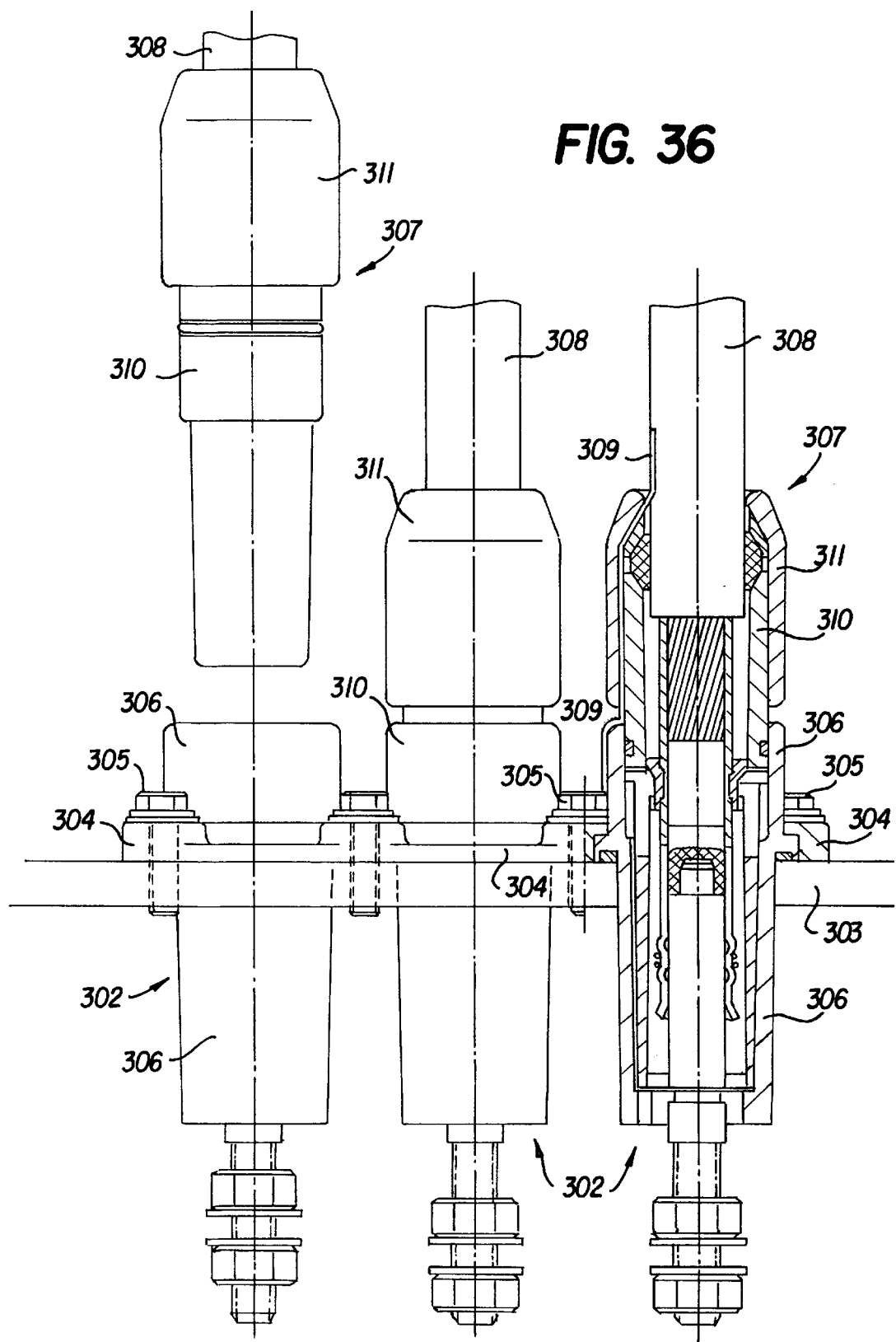
Figure 40:
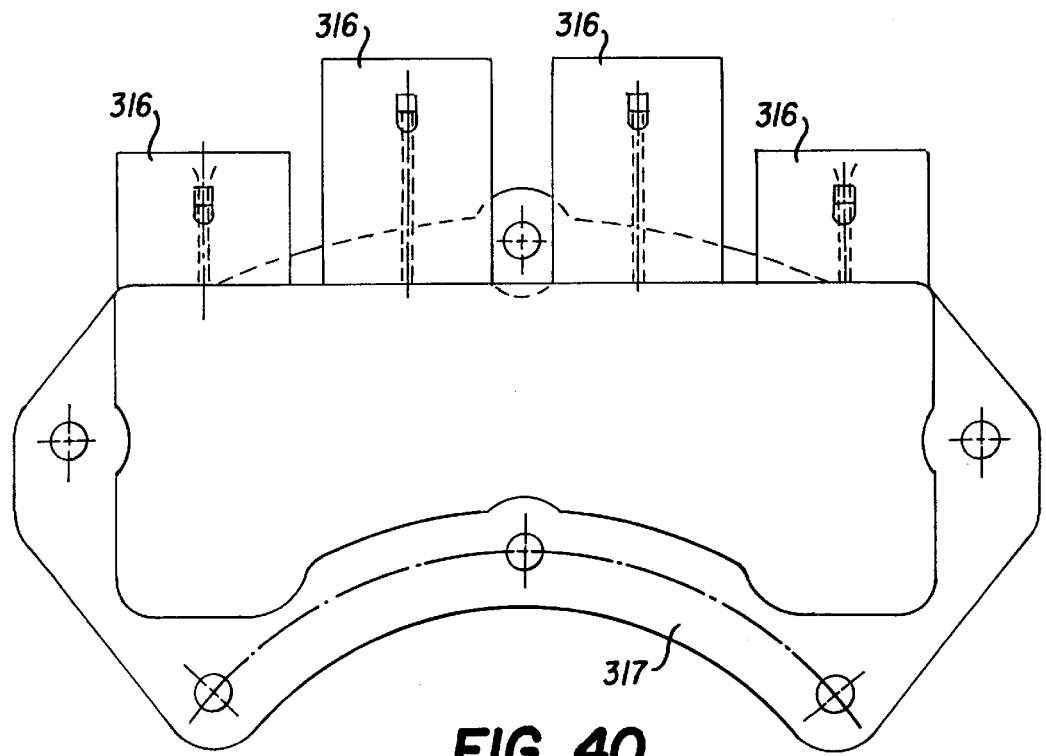
Figure 41:
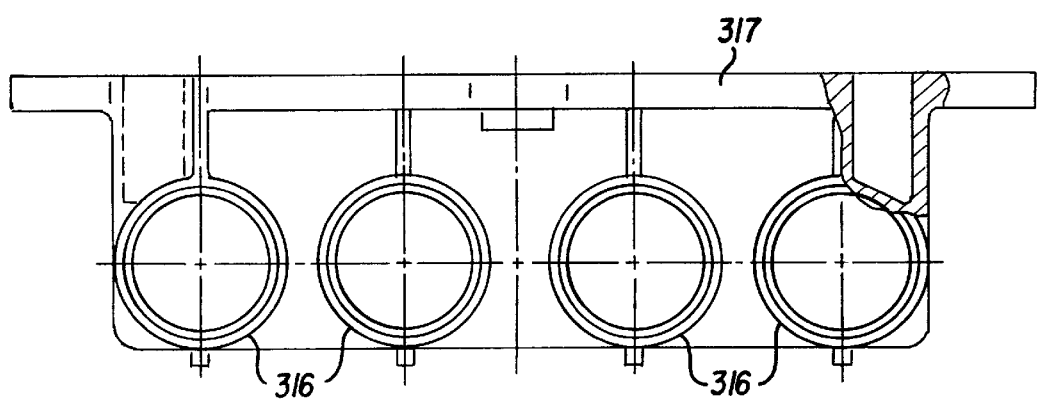
Figure 42:
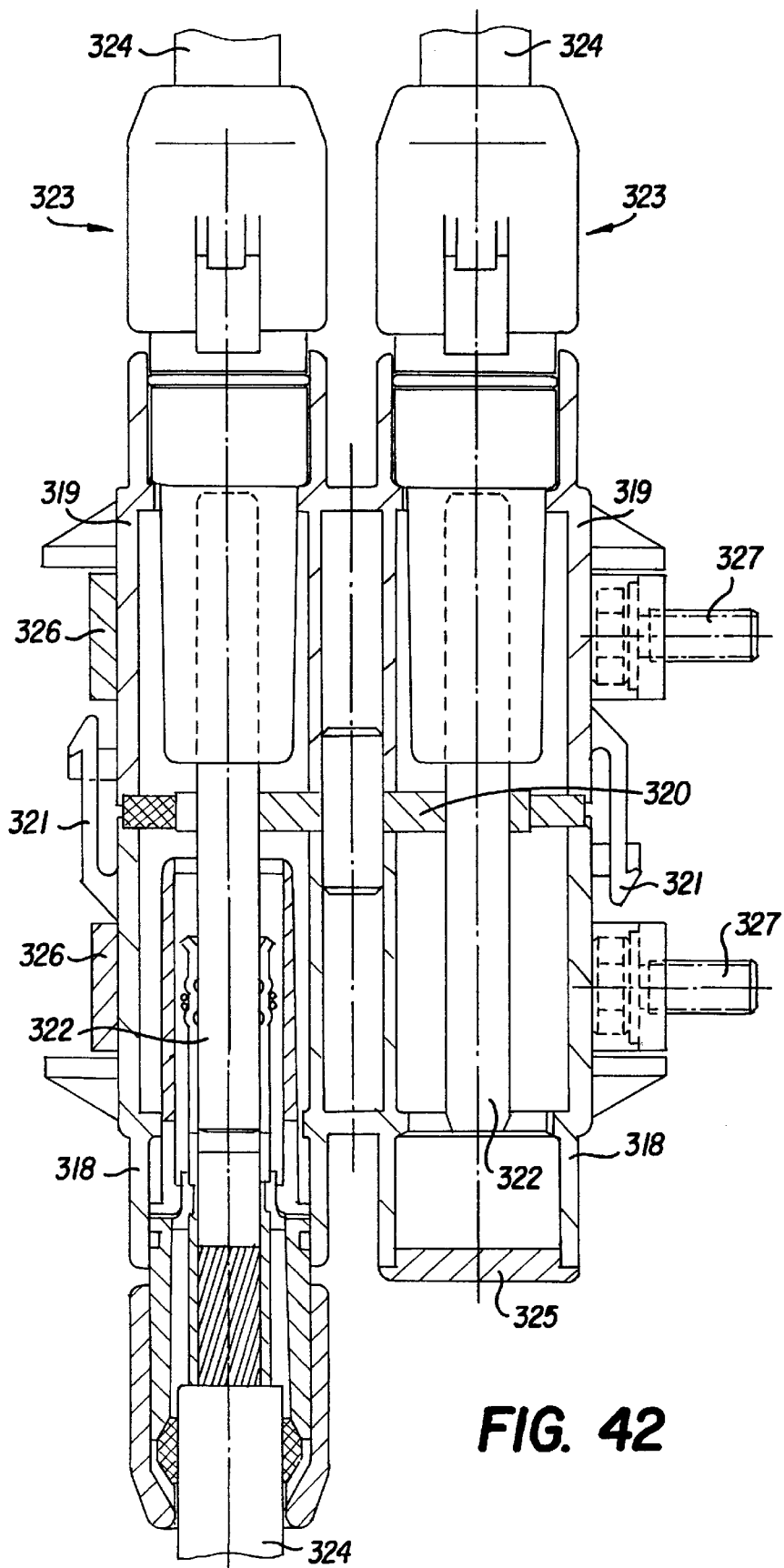

The invention is explained in detail below with the aid of exemplary embodiments represented in the drawing, in which:

FIG. 1 shows a longitudinal section of a first exemplary embodiment in the form of a straight plug-and-socket connection, FIG. 2 shows a top view of a board for forming a female contact, FIG. 3 shows a cross-section, represented enlarged, through the female contact formed from the board in accordance with FIG. 2, FIG. 4 shows a front view, incompletely represented, of an electric motor having cable connections according to the exemplary embodiment in accordance with FIG. 1, FIG. 5 shows a section along the line V—V of FIG. 4, FIG. 6 shows a section along the line VI—VI of FIG. 4, FIG. 7 shows a section along the line VII—VII of FIG. 4, FIG. 8 shows a section corresponding to FIG. 5, but without plug, of a modified exemplary embodiment, FIG. 9 shows a longitudinal section of an exemplary embodiment having two multi-pole plug components, FIG. 10 shows a side view, represented partially sectioned in the longitudinal direction, of the exemplary embodiment in accordance with FIG. 9, FIG. 11 shows a top view of the exemplary embodiment in accordance with FIG. 9, FIG. 12 shows a diagrammatically represented side view of a three-pole plug on the basis of the exemplary embodiment in accordance with FIG. 1, FIG. 13 shows a diagrammatically represented side view of a socket-outlet assigned to the plug in accordance with FIG. 18, FIG. 14 shows a top view of the socket-outlet in accordance with FIG. 13, FIG. 15 shows a side view, enlarged and half of which is sectioned in the longitudinal direction, of a second exemplary embodiment of a single-pole connector, FIG. 16 shows a side view of the exemplary embodiment in accordance with FIG. 15, and the part of an electric appliance represented in section, FIG. 17 shows a side view of the exemplary embodiment in accordance with FIG. 15 in a position rotated by 90°, FIG. 18 shows a side view corresponding to FIG. 16 of a slightly modified exemplary embodiment, FIG. 19 shows a side view of the housing, containing the socket, of the exemplary embodiment in accordance with FIG. 15, FIG. 20 shows a side view of the housing, containing the pin, of the exemplary embodiment in accordance with FIG. 15, FIG. 21 shows a side view of the cap of the exemplary embodiment in accordance with FIG. 18, FIG. 22 shows a cross-section, represented enlarged, of the retaining ring of the exemplary embodiment in accordance with FIG. 15, FIG. 23 shows an end view, represented enlarged, of the housing in accordance with FIG. 19, with a first coding, FIG. 24 shows an end view in accordance with FIG. 23, of the housing in accordance with FIG. 19, with a second coding, FIG. 25 shows a longitudinal section of the socket of a single-pole angle-entry plug, FIG. 26 shows a longitudinal section of this angle-entry plug with a socket in accordance with FIG. 25, FIG. 27 shows a longitudinal section, corresponding to FIG. 26, of an angle-entry plug slightly modified by comparison with the angle-entry plug in accordance with FIG. 26, FIG. 28 shows a top view of the inside of the two halves, connected via a film hinge, of the housing of the angle-entry plug in accordance with FIG. 27, FIG. 29 shows a section along the line XXIX—XXIX of FIG. 28, FIG. 30 shows a first side view of the housing of the angle-entry plug in accordance with FIG. 27, FIG. 31 shows a second side view of the housing of the angle-entry plug in accordance with FIG. 27, FIG. 32 shows a side view according to FIG. 30 of a modification of the housing represented in FIG. 30, FIG. 33 shows a view of the angle housing, containing the pin, of a single-pole plug-in connector, FIG. 34 shows a top view of the underside of the housing in accordance with FIG. 33, FIG. 35 shows a longitudinal section of the housing in accordance with FIG. 33, FIG. 36 shows a three-pole plug-in connector, which is represented partly in side view and partly sectioned in the longitudinal direction, and is formed from single-pole parts, FIG. 37 shows a side view of a three-pole socket-contact part, FIG. 38 shows a section along the line XXXVIII—XXXVIII of FIG. 37, FIG. 39 shows a top view of the front side of the socket-contact part in accordance with FIG. 37, FIG. 40 shows a view of a four-pole appliance socket-contact part, FIG. 41 shows a top view of the end face of the appliance socket-contact part in accordance with FIG. 40, FIG. 42 shows a single-phase device, partly sectioned in the longitudinal direction and partly represented in side view, for connecting a plurality of cables to one another.

All the exemplary embodiments described below are plug-and-socket connections between insulated cables and the components of an electric drive for vehicles, the cables being used to connect the battery to a converter and to connect the latter to the vehicle network and to the electric motor. The connecting system according to the invention is, however, also excellently suited for stationary use, for example for cable connections to a stationary converter, and can also be used wherever similar requirements or similar partial requirements are placed.

The operating voltage is at 1 kV, the maximum current intensity is below 1 kA. However, it is also possible to master higher operating voltages of up to 6 kV.

The exemplary embodiment represented in FIG. 1 has a contact pin 2 guided through a bore in a wall 1 of the housing of an electric motor.

Since the wall 1 does not, as in the exemplary embodiment, consist in the region of the bore of an electrically insulating material, it is necessary to ensure that the contact pin 2 is insulated with respect to the wall 1. The middle section penetrating the wall 1, of the contact pin 2 is provided with an annular groove in which an O-ring 3 is situated in order to form a seal.

The end section, projecting into the interior of the motor housing, of the contact pin 2 is constructed as a press sleeve for a hexagonal moulding.

The contact pin 2 is secured against axial displacement by a collar which bears against the inside of the wall 1, and by a nut 4 which is supported against the outside of the wall 1 with the interposition of a washer.

The part of the contact pin 2 overhanging beyond the wall 1 is surrounded by a plastic tubular housing 5 which is arranged concentrically with and at a spacing from the contact pin, and for connection to the wall 1, housing 5 has an annular flange 6 which is pressed against the wall 1 by screws (not represented) with the interposition of a seal 7. There is therefore a mechanically firm connection which is fluid-tight and electrically tight between the annular flange 6 and the wall. The end of the housing 5 pointing away from the wall 1 is likewise provided with an annular flange 8 which, however, overhangs outward radially only slightly beyond the housing 5.

The free end section 2' of the contact pin 2 consists of an electrically insulating material, the body forming the end section 2' in the exemplary embodiment having a central pin which is fixed in a central blind bore of the contact pin 2. Since the annular gap between the end section 2' and the housing 5 surrounding it is so small that a person's finger cannot be passed through it, the part of the contact pin 2 adjoining the end section 2' is covered in a fashion safe from touch while observing the requirements in accordance with protective class IP 2X.

A female contact 9 can be plugged onto the contact pin 2, and one of its end sections, which receives the section, consisting of contact material, of the contact pin 2, consists of radially resilient contact tongues 9' (FIG. 2) which extend in the longitudinal direction of the female contact 9 and are all identically constructed and each separated from one another by a slot 57 of the same size. The other end section of the female contact 9 is constructed as a press sleeve 9". A hexagonal moulding produces a connection of high mechanical and electrical quality between the press sleeve 9" and the end section, situated in it, of the core of an insulated cable 11. Of course, it would also be possible, however, to provide a different high-quality connection. The female contact 9 is produced from a rectangular board,56 as represented in FIG. 2. The board 56 is provided with slots 57 for forming the contact tongues 9', which extend parallel to one another and are all constructed identically. Before the board 56 is yet shaped to form a hollow cylindrical body, the contact tongues 9' are provided with two projections 58 (FIG. 3) overhanging their surface. Furthermore, the free end of the contact tongues 9' is bent outwards in a rounded fashion, and the contact tongues 9' are given a curvature in the transverse direction, for which the radius of curvature is smaller in the region of the contact side situated inside after production than the radius of curvature of the inside of the cylindrical middle section, bearing the contact tongues 9', of the female contact 9, with the result that the edge zones 60 of the contact tongues 9' protect radially inward beyond the middle zone situated between the edge zones 60. Consequently, each contact tongue 9' forms two line contacts with its two edge zones 60. After the board, processed in the above way and representing a bent stamping, has been rolled to form a hollow cylindrical body, there is laid around the contact tongues 9', in the region between their projections 58, a spring 61 which ensures the desired contact pressure between the edge zones 60 of the contact tongues 9' and the contact pin 2 inserted into the female contact 9.

Provided at the transition from the pressure sleeve 9" to the middle section, bearing the contact tongues 9', of the female contact 9 is an annular flange of small axial dimension against which there is supported a supporting tube 12 which concentrically surrounds the press sleeve 9" and whose other end, forming an inner cone, is supported against an annular body 13. This annular body 13 bears against the insulation of the insulated cable 11 over its entire circumference in a sealing and adhesive fashion. On the other hand, the deformable annular body 13 bears against the inner wall of one end section of a housing 14 which concentrically surrounds the female contact 9 and consists of insulating plastic and which, as FIG. 1 shows, extends outwards somewhat beyond the free end of the female contact 9. At this end, it has a flange which projects radially inward and delimits an opening whose diameter is only slightly larger than the diameter of the contact pin 2. Even in the case of very high current intensities, the diameter of the contact pin 2, and thus the diameter of the opening at the free end of the housing 14, can be kept so small that touching of the female contact 9 by the finger is excluded, the more so as the female contact 9 ends at a spacing from the opening at the free end of the housing 14.

In that section which, during production of the plug-and-socket connection, is inserted into the cylindrical channel formed by the housing 5, the outside diameter of the housing 14 is selected such that there is virtually no play between the housing 14 and the housing 5 in this region. If the sealing thereby achieved should not suffice, it is possible to provide at least one O-ring which is fitted into an outwardly open annular groove of the section of the housing 14 engaging in the housing 5. In addition to or instead of such an O-ring, it is possible to arrange a ring seal between the free end of the housing 5 and a shoulder of the housing 14, at the transition from the section which can be inserted into the housing 5 to the section surrounding the supporting tube 12.

In order for the annular body 13 to be able to produce and maintain a tight connection between the housing 14 and the insulated cable 11, as well as strain relief of the cable, provision is made for a sealing cap 15 which consists of plastic and overlaps the end section of the housing 14 bearing against the annular body 13, and which presses against the annular body 13 by means of an inner cone. The connection of the protective cap 15 to the housing 14 is performed by two diametrically arranged, radially resilient pairs 16 of latching tongues which penetrate clips 17, which are integrally formed in the diametrical position on the housing 14, and grip behind the yoke section of said clips 17.

When the plug-and-socket connection has been produced, the housing 14 is connected to the housing 5 by means of an open, radially resilient connecting ring 18, which has an annular groove which is open radially inward. This annular groove receives the annular flange 8, present at the free end of the housing 5, and an annular flange 14' provided on the housing 14, of the same size, and clamps the two against one another. The fact that the connecting ring 18 bears under pretensioning against the housings 5 and 14, produces a connection which is reliable and insensitive to vibration. It would also be possible, for example, to provide instead of such a connecting ring 18 a union nut having an internal thread or a bayonet lock, it being the case that the other housing would then need to have a complementary design, depending on which of the two housings 5 and 14 the union nut was arranged on.

A version of the system according to the invention and having angle-entry plug-and-socket connections is shown in FIGS. 4 and 7 in conjunction with an electric motor 25 which is used to drive a vehicle. Since the electrical motor 25 is a three-phase AC motor which is to be capable of switching from a delta connection to a star connection and vice versa, the connection of a neutral conductor is necessary. A four-pole plug-and-socket device 26 is therefore provided on one end face of the electric motor 25. The cable plugs 27 to be connected to this plug-and-socket device 26 are all of identical construction, specifically by cable plug represented in FIG. 1, which has as a contact element the female contact g (represented only diagrammatically) which is located in the housing 14 which is sealed on its rear side by means of the sealing cap 15 with the formation of a pressure-relieving and sealing connection to the insulated cable. This match is shown in FIGS. 5 and 6.

As shown in FIG. 5, in one of its end walls the metallic housing 28 of the electric motor 25 has, for the plug-and-socket device, three through bores 29, which are arranged offset with respect to one another in the circumferential direction and are each aligned with a bore in an insulating body 30 which is fixed in the housing 28. Each of these mutually aligned bores penetrates a contact pin 31 whose end section projecting into the interior of the housing 28 is constructed as a press sleeve. The section situated in the insulating body 30 is provided with an annular groove in which there is situated an O-ring 32 which seals the bore of the insulating body 30 together with the contact pin 31.

The section penetrating the housing 28 bears a locking sleeve 33 which consists of plastic and has a plurality of radially resilient tongues 34 which bear against the contact pin 31 and are arranged distributed over the circumference thereof, and which engage with their inwardly angled end in an annular groove of the contact pin 31. The tongues 34 project in the axial direction from an end wall, penetrated by the contact pin 31, of the locking sleeve, onto which there is integrally formed a cylindrical outer wall which surrounds the tongues 34 concentrically at a spacing and has the same axial extent as the tongues 34. Plugged in between the freed end sections of the tongues 34, on the one hand, and the outer wall, on the other hand, is a retaining bush 35 which is made from plastic and prevents the ends of the tongues 34 from being able to escape from the annular groove of the contact pin 31 receiving them. The retaining bush 35 has an end wall which is in the form of an annular disc, bears against the end face of the outer wall and of the tongues 34 of the locking sleeve 33, and has an inside diameter which is matched to the outside diameter of the contact pin 31.

After the end of the stator winding of the electric motor 25 assigned to the contact pin 31 has been connected to its press sleeve, said contact pin is pushed from the inside outward through the insulating body 30 until it is possible to push the locking sleeve 33 on from the free end of the contact pin 31 until the tongues 34 latch tightly into the annular groove of the contact pin 31 and the end wall bears against the insulating body 30. After the retaining bush 35 has further been inserted between the tongues 34 and the outer wall, the contact pin 31 is secured in a self-closed fashion against being displaced backward into the interior of the housing 28 of the electric motor 25. If the winding ends of the stator winding are sufficiently long, it is, of course, also possible to guide the winding ends outward, to connect them there to the contact pin 31 and then insert them from outside into the through bores 29 and the insulating body 30.

As shown in FIG. 6, in addition to the three contact pins 31, which are constructed in the previously described way and are, as shown in FIG. 4, arranged offset in the circumferential direction at the same spacing from the longitudinal central axis of the electric motor 25, there is provided, for the cable forming the neutral conductor, a contact pin 36, which has the same outside diameter as the contact pins 31 and is arranged in the exemplary embodiment with the same spacing from the longitudinal axis of the electric motor as the contact pins 31 and offset to the same extent as the latter in the circumferential direction. The end, pointing toward the interior of the housing 28 of this contact pin 36, is provided with a thread and screwed from the outside into a threaded bore of the end wall of the housing 28 and also retained by a nut. The overhang beyond the outside of the end wall is precisely as large as the overhang of the contact pins 31.

Both the contact pins 31 and the contact pins 36 are covered by a box-shaped basic housing 37 of the plug-and-socket device 26 which, like all the remaining housing parts of the connecting system, consists of a chemically resistant, dimensionally stable, electrically insulating plastic. The basic housing 37 has on its open underside a circumferential flange 37', which overhangs outward, bears against the end face of the housing 28 with the interposition of a circumferential seal situated in a groove of the basic housing, and is connected to the seal by screws 38 in a mechanically firm and sealing fashion. As FIGS. 5 and 6 show, only a slight gap is present between the end, situated in the basic housing 37, of the contact pins 31 and 36, on the one hand, and the end wall 37" of the basic housing 37, on the other hand. The contact pins 31 and 36 are therefore secured by the basic housing 37 in a self-closed fashion against axial displacement tending to enlarge the overhang beyond the end wall of the housing 28.

Plastic cylindrical housings 39 which, apart from the axial length and the construction of their bottom end, are constructed like the housing 14, project from the radially outwardly pointing side wall of the basic housing 37 in a fashion parallel to one another and at a spacing corresponding to the spacing between the contact pins 31 and 36, at a right angle to the longitudinal axis of the assigned contact pin 31 or 36. The cylindrical housing 39 is shorter than the housing 14, and its bottom end is screwed into a threaded bore of the side wall of the basic housing 37, shoulder surfaces of the housing 39 and of the basic housing 37 which bear against one another ensuring a tight connection. However, the housings 39 could also, of course, be connected in a mechanically firm and tight fashion to the basic housing 37 in another way or, as is advantageous, be constructed in one piece with said basic housing.

Situated on the longitudinal axis of each of the three housings 39, which are aligned with one of the contact pins 31, is a contact pin 40 whose section serving to make contact is constructed like the corresponding section of the contact pin 2 of the exemplary embodiment in accordance with FIG. 1, and therefore also has an end section 40' consisting of an electrically insulating material. This end section 40' which extends up to the free end of the housing 39 forms, together with the housing 39, the touch guard for the contact pin 40. The contact pin 41 assigned to the contact pin 36 does not require such a touch guard. It therefore consists of contact material up to its free end, which is terminated by the free end of the housing 39 surrounding it. Consequently, if the cable plugs 27 were replaced by a four-pole cable plug or were to be interconnected to such a cable plug, during disconnection of the plug-and-socket connection, the plug-and-socket connections assigned to the three phases would firstly be disconnected, and the plug-and-socket connection of the neutral conductor would not be disconnected until after that, which is desirable for reasons of safety.

Both the contact pins 40 and the contact pin 41 are borne by a T-piece 42 made from a material which is a good conductor of electricity. As FIGS. 5 and 6 show, the transverse part of the identically constructed T-pieces 42 is penetrated by a bore whose diameter is only slightly larger than the outside diameter of the contact pins 31 and 36. At half its length, this bore is provided with an annular groove in which there is situated a laminated contact element 43 which produces a multiline contact capable of being highly loaded which maintains its quality over long periods. The longitudinal part 42', extending at a right angle to the transverse part, of the T-piece 42 connects the transverse part to the contact pin mechanically and electrically.

As shown, in particular, by FIG. 7, each of the longitudinal parts 42' of the T-pieces 42 is held in place by two clamping tongues 44 which are integrally formed on the end wall 37" of the basic housing 37 and each forms a clamping holder which holds the contact pins 40 or 41 in a position aligned with the longitudinal axis of the assigned housing 39.

As FIG. 5 shows, the two sides of the transverse part of those T-pieces 42 which are plugged onto one of the contact pins 40 are adjoined in each case by an intermediate ring 45 which is made from an elastomeric material, which intermediate rings 45 distance the transverse part from the retaining bush 35 and the end wall 37" of the basic housing 37. It is ensured in addition thereby that, when the basic housing 37 is fitted to the housing 28, and the T-pieces 42 are plugged in the process onto the assigned contact pins 40 and 41, the T-pieces 42, and thus the contact pins 40 and 41 borne by them, remain in the correct position relative to the assigned housing 39.

When the cable plugs 27 are completely inserted into the assigned housing 39, the free end of the housing 14 of the cable plug 27 projecting into the basic housing 37, they are secured against disconnection by means of one retaining ring 47 each, which is constructed like the retaining ring 18 of the exemplary embodiment in accordance with FIG. 1. As FIGS. 5 and 6 show, the retaining ring 47 overlaps two narrow annular flanges from outside, which are provided on the free end of the housing 39 and of the housing 14, and thereby holds said annular flanges bearing against one another.

If necessary, a seal can be provided between these two annular flanges. It is likewise possible, if required, to provide a seal between the outer lateral surface of the housing 14 and the inner lateral surface of the housing 39, for example, in the form of an O-ring, situated in an annular groove of the housing 14.

If, as is the case in the exemplary embodiment in accordance with FIGS. 4 to 7, the possibilities for assembly do not render it necessary in the case of an angle connector to construct the contact pin or the contact pins in a split fashion, preference will be given to an unsplit construction, both for technical reasons and on grounds of cost. Such an unsplit construction is shown in FIG. 8.

The contact pin denoted as a whole by 140 has an end section to be connected to the stator winding, which is constructed like the contact pin 31 of the exemplary embodiment in accordance with FIGS. 4 to 7, and is fixed and sealed in the motor. A middle section, in the shape of a quarter of a circular arc, connects this end section to the end section cooperating with the female contact of a connector, and which bears at its free end the insulating body 140' which serves the touch guard and is constructed like the end section 40'. Up to the insulating body 140', the contact pin 140 is designed in one piece made from contact material. If necessary, the end section bearing the insulating body 140' can be held by two clamping tongues.

FIG. 8 shows further that the part 139 of the housing which concentrically surrounds the end section with the insulating body 140' at a spacing is constructed in one piece with the basic housing 137. For further details, reference is made to the discussion relating to FIGS. 4 to 7, because no differences are present to that extent, for which reason the same reference numerals are used for the same parts.

As far as the cable plug is concerned, the exemplary embodiment represented in FIGS. 9 to 11 also does not differ from the exemplary embodiments already described. Consequently, the cable plugs are also marked here by 27. The construction of the plug-and-socket device marked as a whole by 48 deviates from the exemplary embodiments in accordance with FIGS. 1 and 4 to 8. Said plug-and-socket device has a rectangular plastic base plate 49 on which, aligned with its longitudinal centre line, three cylindrical housings 50 are integrally formed at a spacing from one another. It is also possible, of course, to provide a different number of housings 50. As FIGS. 9 and 10 show, a relatively short section of the housing 50 overhangs the outside, and a relatively long section overhangs the inside of the base plate 49, which bears against a housing wall 51 or the like and is connected to the latter firmly and, if necessary, tightly, for example by means of screws 52. The housing wall 51 is provided with through openings for the housings 50.

Apart from the end pointing away from the cable plug 27, the housings 50 have the same construction as the housing 5 of the exemplary embodiment in accordance with FIG. 1, because the section, surrounding the female contact of the cable plug 27, of the cable plug housing is inserted into each of the housings 50 without appreciable play. The end, averted from the cable plug 27, of the housings 50 is sealed by a base which is penetrated by a contact pin 53 whose section which makes contact is constructed in the same way as the contact pin 2. It differs from the latter only in that it is firmly connected to the base of the housing 50 and instead of a press sleeve has a terminal lug 53' with a through bore. A busbar or a cable lug, for example, can be connected without any problem to the terminal lug 53'.

Because of the relatively small interspace between the housings 50, as shown in FIG. 11, the radially outwardly overhanging annular flanges on the housings which are to be connected to one another do not extend over the entire circumference. In the two outer plug-and-socket connections, the interruption is aligned with the middle plug-and-socket connection, and in the case of the latter it is aligned with one of the two longitudinal sides of the base plate 49. The three retaining rings 54, which overlap the annular flanges and hold them together, have a yet somewhat larger interruption. The interruptions in the retaining rings 54 have the same alignment as those of the annular flanges. It is possible thereby to realize a very slight spacing between the housings 50 and the cable plugs 27.

As FIGS. 12 to 14 show, it is not only the plug-and-socket device 62 to be provided at the appliance which can be constructed as a unit, but also the plug-and-socket device 63 to be provided at the cables. The latter plug-and-socket device is constructed in the exemplary embodiment as a three-pole plug which is assembled from three individual cable plugs 65 which are connected to one another by integrally formed connecting elements 64 and are constructed, moreover, like the cable plug 27 of the other exemplary embodiments.

Since the two plug-and-socket devices 62 and 63 are each constructed as a module, it is possible for the purpose of connecting the two modules, for example, to provide latching tongues 66 on one subassembly, which cooperate with latching elements 67 on the other sub-assembly.

FIGS. 15 and 17 show an exemplary embodiment of a single-pole plug-in connector according to the invention which is improved in various regards by comparison with the exemplary embodiment in accordance with FIG. 1. In particular, its costs are much less than those of the exemplary embodiment in accordance with FIG. 1, to which a contribution is also made by the much reduced number of individual parts.

A beaker-shaped first housing 205, consisting of insulating plastic, for a cylindrical pin 202 serving as contact pin is provided with a central opening in its base, into which the pin 202 is pressed. The latter ends at a spacing from the open end of the cylindrical housing 205 and can, if a touch guard is necessary, have an electrically insulating end section, as is also the case for the contact pin 2 of the exemplary embodiment in accordance with FIG. 1. The annular space between the pin 202 and the inner wall of the first housing 205 is so narrow that a test finger cannot be inserted.

Assigned to the socket part, comprising only the pin 202 and the first housing 205, of the plug-and-socket connection is a male connector which is provided at one end of an insulated cable 211. As contact element, the male connector contains a female contact 209 which, like the pin 202, consists of a copper alloy with good contact properties. The contact pin 202 and the female contact 209 can be tinned or silvered to improve the contact properties and/or for reasons of protection against corrosion.

The female contact 209 is essentially constructed like the female contact 9. A middle section of the female contact 209, which fills up a metallic insert 210, has a hexagonal moulding 208. The bared core of the cable 211 is inserted into one end section of the female contact 209 until it bears against the insert 210. The female contact 209 then abuts the insulation of the cable 211. Two hexagonal mouldings produce a mechanically firm and electrically high-quality connection between the core of the cable 211 and one end section of the female contact 209. The other end section of the female contact 209 is formed by contact tongues 209' which extend in the longitudinal direction of the socket, are of identical construction and radially resilient, and which are distributed uniformly over the circumference of the female contact 209 and separated from one another by in each case one slot of the same width. Although the end section of the pin 202 tapers conically, in the region of their free end the contact tongues 209' are bent slightly outward to form a funnel which facilitates plugging the female contact 209 onto the pin 202. Like the contact tongues 9' of the female contact 9 of the exemplary embodiment in accordance with FIGS. 1 to 3, the contact tongues 209' have a smaller radius of curvature than the pin 202, with the result that two lateral edge zones of the contact tongues 209' each form a line contact with the pin 202. The required contact pressure is generated with the aid of a spring 261 which grips the contact tongues 209' by means of a plurality of turns, two in the exemplary embodiment, and presses them radially inward. Two projections 262, which are pressed out in the middle from each contact tongue 209' at a spacing from one another, in each case secure the spring 261 against displacement in the longitudinal direction of the tongue.

The female contact 209 is produced from a board. The contact tongues 209' are firstly stamped free, and the projections 262 are formed. The end sections of the contact tongues 209' are then bent, and the contact tongues 209' are given a transverse curvature. Thereafter, the board, which forms a bent stamping, is rolled to produce a sleeve. The number of the contact tongues 209' and their length can be selected in accordance with the requirements, for which reason it is also possible to achieve very high current loadings. Nevertheless, the contact system is robust and, in particular, insensitive to dimensional tolerances.

The female contact 209 is arranged in a second cylindrical housing 214, which comprises an electrically insulating material and, like the first housing 205, is dimensionally stable. As FIG. 15 shows, there is integrally formed on the outside of the second housing 214 at about half the length an annular collar which is provided with an outwardly open annular grove 214' in which an O-ring 212 is situated.

Adjoining this annular collar is, on the one hand, that section of the second housing 214 which, when the plug-and-socket connection is produced, is inserted over its entire length into the first housing 205. In the completely inserted state, it extends to near the base of the first housing 205, and therefore a little further beyond the free end of the contact tongues 209'. The section, intended for engagement in the first housing 205, of the second housing 214, has an outside diameter matched to the inside diameter of the first housing 205 and, in addition, a base which lies in a radial plane and has a central through opening for the pin 202. Therefore, when it is completely inserted into the first housing 205, this part of the second housing 214 is supported virtually without play on the first housing 205, as a result of which external force influences are reliably kept away from the contact system.

The part, situated outside the first housing 205 when the plug-and-socket connection has been produced, of the second housing 214, overlaps the end section of the insulation of the cable 211 and is supported on a sealing ring 263 applied to the insulation of the cable 211.

An open connecting ring 264, which consists of plastic and whose inner profile is matched to the outer profile of the hexagonal moulding 208, is clipped onto the hexagonal moulding 208 of the middle section of the female contact 209 to produce a self-closed connection between the second housing 214 and the female contact 209. The connecting ring 264 forms an outwardly open annular groove in which at least two projections 265 integrally formed on the inner wall of the second housing 214 latch-tight in a self-closed fashion in the axial direction. As a result, the second housing 214 is connected in a self-closed fashion and at least essentially without play to the female contact 209.

Apart from the second housing 214, the male connector also has a cap 215, which in the exemplary embodiment likewise consists of an insulating material. However, it could also consist of metal, something which comes into question chiefly when a screened cable is used and the screen has to be grounded in the region of the plug-and-socket connection. At one of its ends, the cap 215 has an opening for the passage of the cable 211 and, adjoining this opening, a conical inner surface by means of which it presses the sealing ring 263 both against the insulation of the cable 211 and against an inner conical surface at the end of the second housing 214. The latter is here therefore sealed in a fluid-tight and electrically tight fashion. In addition a good strain relief is achieved.

The cap 215 overlaps the part of the second housing 214 which is situated outside the first housing 205 when the plug-and-socket connection has been produced, and does so without play thanks to a conical outer lateral surface of the second housing 214 in the end section overlapped by the cap 215 and a corresponding conical inner lateral surface of the cap 215. As may be seen, in particular, in FIG. 16, the cap 215 has two diametrically arranged radially resilient lugs 215 which extend in the axial direction and, when the plug-and-socket connection has been produced, overlap the first housing 205 and produce therewith a latching connection which is self-closed in the axial direction. For this purpose, one radially projecting nose 266 each is integrally formed on the outside of the first housing 205 in two diametrically opposite regions, and two hooks 267 which point toward one another and interact resiliently with one another are integrally formed on both sides of said nose. As FIG. 17 shows, the nose 266 engages in a central longitudinal slot 216' of the lug 216. The two lateral edge zones of the lug 216 are overlapped by the hooks 267, as a result of which the nose 266 and the lug 216 are held in engagement with one another. It is ensured thereby that the second housing 214 cannot unintentionally move out of the first housing 205. The plug-and-socket connection is therefore also vibration-resistant. The depth of penetration of the second housing 214 into the first housing 205 is limited by a shoulder which is formed near the open end of the first housing 205 by a step-shaped enlargement of the inside diameter thereof, and which forms a stop surface for the annular shoulder of the second housing 214. Since, whenever the annular collar bears against the said shoulder of the first housing 205, the O-ring 212 bears in a sealing fashion against the inner lateral surface of the first housing 205, the latching connection furthermore ensures a fluid-tight and electrically tight seal of the first housing 205 between the cap 215 and the first housing 205.

Two cutouts 268 of the cap 215 which are arranged offset with respect to the lugs 216 in the circumferential direction serve to receive in each case one projection 269 of the housing 214. Owing to the engagement of the projections 269 in the cutouts 268, the cap 215 is connected to the second housing 214 not only securely against rotation but also in a self-closed fashion in the axial direction.

As FIG. 19 and FIGS. 23 and 24 show, two longitudinal grooves 270 can be provided in the outer lateral surface of the section of the second housing 214 which engages with the first housing 205. If the first housing 205 is provided with correspondingly arranged projections for engagement in the longitudinal grooves 270, it is possible to ensure by means of different angles by which the two longitudinal grooves 270 are offset with respect to one another in the circumferential direction that only a specific male connector can be plugged into the female connector, which is important, for example, when it is necessary to produce connections in a multiphase system, and therefore to ensure an in-phase connection. The longitudinal grooves 270 and the projections, cooperating with them, of the first housing 205 thus form a simple coding system.

As FIGS. 16 and 18 show, the pin 202 can be constructed as a press sleeve at its end averted from the female contact 209. This press sleeve can be situated, for example, in the interior of an appliance by which the female connector of the plug-and-socket connection is permanently connected.

Furthermore, FIGS. 18 and 21 show that the cap 215 can also be designed with a single lug 216 if the forces to be transmitted permit a second lug to be dispensed with.

The exemplary embodiments explained and represented below are intended chiefly to show that the design principle on which the plug-and-socket connection in accordance with FIGS. 15 to 24 is based can be matched to different requirements without any problem-and without thereby losing its advantages.

Thus, for example, as shown in FIGS. 25 and 26, the male connector can be constructed as an angle-entry plug 271 which is assigned a straight socket-contact part 272. The contact system comprises a pin (not represented) of the socket-contact part 272 and a female contact 273 of the angle-entry plug part 271. The female contact 273 differs from the female contact 209 only in that it has two mutually separated sections which are pressed by one or the other of the limbs of a rectangular insert 274. One section forms the contact tongues 275, and the other the press sleeve for connection to the core of the cable. A further difference consists in that there are integrally formed, on the angular part 276 of the angle-entry plug 271, latching tongues 276' by means of which it is possible to produce a self-closed connection with the housing of the female connector 272. The cap 277 need therefore overlap only an end section of the part 276 of the second housing. As a consequence of the angular shape of the female contact 273, the second housing of the angle-entry plug 271 comprises three parts, specifically the section 278 which can be plugged into the housing of the socket-contact part 272 and which is connected in a self-closed fashion, in the same way as the second housing 214, to the female contact 273, as well as two half shells 279 which form the part 276 and are permanently connected to one another and receive the insert 274 and the end section, forming the press sleeve, of the female contact 273. The cap 277 seals the cable-side end of the part 276, formed from the two half shells 279, of the second housing. The lugs 276' corresponding to the lugs 216 are integrally formed on the two half shells 279. In the exemplary embodiment, they grip behind the web of one clip each.

To the extent that a housing of the connecting system according to the invention must be assembled from two half shells, it is expedient to connect the half shells to one another by a film hinge 281, so that the two half shells can be produced simultaneously and can be joined in a particularly easy way to form the housing. An angle plug-and-socket connection having such a housing is shown in FIGS. 27 to 32. This exemplary embodiment differs from the exemplary embodiment shown in FIG. 26 only in terms of the angle housing, denoted as a whole by reference numeral 282, for which reason only that element is explained below.

As FIG. 28 shows, the two half shells 283 are constructed identically in a mirror-image fashion. Provided near one end of the receiving channel, constructed of the two half shells 283, of the female contact, which is constructed like the female contact 273, is a radially inwardly projecting annular collar 285 which engages in a corresponding annular groove of the housing part 287, which can be inserted into the first housing 286 and does not differ essentially from the part, engaging in the first housing 205, of the second housing 214. Integrally formed on the other end of the central channel are two radially inwardly projecting annular collars 288, which are pressed with the required force against the insulation of the cable 289 when the two half shells 283 are latched with one another. Along the central channel, there are integrally formed on the two half shells mushroom-shaped latching elements 290 which latch each respective half shell 283 tightly into one opening 291, and thereby mould the two half shells together in a mechanically firm fashion. Also integrally formed on the two half shells 283 are sealing ribs 293, which extend along the entire central channel 292, have a profile in the shape of a mushroom head and engage in correspondingly constructed grooves 294 of the other half shell, and thereby seal the joints in a fluid-tight and electrically tight fashion.

As FIG. 32 shows, instead of the latching elements 290 in the shape of a mushroom head, it is also possible to provide, for example, hook-shaped latching elements 295 which overlap the edge of the other half shell.

FIGS. 33 to 35 show that, instead of a straight form, the female connector of a plug-and-socket connection can also have an angular form. The section, containing the female contact, of the housing of the associated male connector is plugged into the part of the housing 296 denoted by reference numeral 297, as has been described in connection with the exemplary embodiment in accordance with FIG. 15. The only difference from the exemplary embodiment in accordance with FIG. 15 is that the part 297 is adjoined at a right angle by a part 298 on which in the exemplary embodiment, a flange 299 is integrally formed, and that the pin 300 emerges from the housing 296 through the part 298 and, in the process, bears laterally against walls 301 which are integrally formed on the housing 296.

A plurality of plug-and-socket connections can be assembled to form a group without any problem, in order, for example, to be able to produce a multiphase connection. In the exemplary embodiment represented in FIG. 36, three identically constructed socket-contact parts 302 are inserted into a carrier plate 303 and firmly connected to the latter by means of a connecting flange 304 and screws 305. Integrally formed on the housing 306 of each socket-contact part 302, for the purpose of supporting the connecting flange 304, is an annular flange which is supported on the carrier plate 303 via a ring seal. Otherwise, the identically constructed socket-contact parts 302 do not differ essentially from the socket-contact part in accordance with FIG. 15.

A male connector 307 can be inserted into each socket-contact part 302. These male connectors 307 are of identical construction and do not differ essentially from the male connector in accordance with FIG. 15. However, a difference is present to the extent that the cables 308 have a woven screen 309 which is guided through between the electrically insulating housing 310 of the male connector 307 and the cap 311, which overlaps the housing 310 a little further, to the screws 305, and is grounded via the latter. The cap 311 advantageously consists of metal in this case.

As FIGS. 37 to 39 show, for the purpose of a multiphase connection, the housings 312 of the socket-contact parts can be constructed in a connected fashion, specifically also in one piece with a mounting flange 313, if required. In the exemplary embodiment, the housings 312 are therefore connected to one another not only via the mounting flange 313, but also via one web 314 each.

A particular feature of this three-pole socket-contact is shown in FIGS. 38 and 39. The pin (not represented) to be arranged in each housing 312 is not pressed into a central opening of the housing base. Rather, it is held in place by a plurality of radially resilient fingers 315, four in the exemplary embodiment, which engage in an annular groove of the pin and thereby secure the latter against longitudinal displacement relative to the housing 312.

As in the case of individual plug-and-socket connections, the female connector can form angle socket-contacts in the case of multipole plug-and-socket connections as well. The arrangement of the individual angle socket-contacts in the case of the four-pole angle socket-contact represented in FIG. 40 is comparable with the arrangement in accordance with FIG. 4. The housing parts 316 into which one of the male connectors is to be plugged in each case are situated with their longitudinal axis in a plane parallel to the common mounting flange 317. However, in the direction of their longitudinal axis, the two middle housing parts 316 are offset with respect to the two outer housing parts 316 because, as in the case of the exemplary embodiment in accordance with FIG. 4, the limb, extending in the axial direction, of each pin, whose other limb is situated in the centre of the assigned housing part 316, is to have a prescribed spacing from a central longitudinal axis.

A further example for the high adaptability of the connecting system according to the invention is shown by the multipole connecting device represented in FIG. 42, in the case of which all the poles are connected to one another in an electrically conductive fashion. As FIG. 42 shows, a first pair of socket-contacts is connected at the end, averted from the associated male connectors, of its two identical housings 318, constructed in one piece, to the housings 319, likewise identical and constructed in one piece with one another, of a second pair of socket-contacts, in such a way that one of the housings 318 is aligned with one of the housings 319 in each case. Clamped between the two housing pairs is a contact bar 320, which is insulated with respect to the housings 318 and 319 held together by the lugs 321. Two pins 322 fixed in the contact bar 320 project to the same extent into the two mutually aligned housings 318 and 319 and lie on the longitudinal axis thereof. The associated-male connectors 323 are essentially of the same construction as the male connector of the exemplary embodiment in accordance with FIG. 15. FIG. 42 represents three of these identically constructed male connectors 323 which are plugged into one of the two housings 318, or into the two housings 319. The insulated cable 324, at whose ends the male connectors 323 are provided, are therefore all connected to one another in an electrically conductive fashion. The socket-contact not assigned is sealed tight by means of a sealing cover 325.

Both the housing pair 318 and the housing pair 319 are overlapped in the exemplary embodiment by, in each case, one clip 326, by means of which, with screws 327, the entire device can be mounted on a carrier. Other types of mounting can also be considered, of course.

We claim:

1. A connection system for electrical conductors, in particular insulated cables which are connected to electrical equipment, in particular components of an electric drive for vehicles, by means of which system at least one plug-and-socket connection can be produced, said plug-and-socket connection being capable of transmitting high currents, said plug-and-socket connection being made from two intermateable contact elements forming a multi-line contact, wherein one of said contact elements comprises a pin and another of said contact elements comprises a socket, and wherein:

the socket has tongues which extend in a socket longitudinal direction, and which are resilient in a radial direction, and which have at least one material part extending in a tongue longitudinal direction and projecting radially inward to provide a line contact, the pin of each plug-and-socket connection is contained in a first electrically insulated housing, and the socket of each plug-and-socket connection is contained in a second electrically insulated housing, the two housings are adapted to plug into one another, and are connected in a fluid-tight and electrically integral fashion when they are plugged into one another, and wherein said at least one material part is formed by longitudinal edges of the tongues.

2. A connection system for electrical conductors, in particular insulated cables which are connected to electrical equipment, in particular, components of an electric drive for vehicles, by means of which system at least one plug-and-socket connection can be produced, said plug-and-socket connection being capable of transmitting high currents, said plug-and-socket connection being made from two intermateable contact elements forming a multi-line contact, wherein one of said contact elements comprises a pin and another of said contact elements comprises a socket, and wherein:

the socket has tongues which extend in a socket longitudinal direction, and which are resilient in a radial direction, and which have at least one material part extending in a tongue longitudinal direction and projecting radially inward to provide a line contact, the pin of each plug-and-socket connection is contained in a first electrically insulated housing, and the socket of each plug-and-socket connection is contained in a second electrically insulated housing, the two housings are adapted to plug into one another, and are connected in a fluid-tight and electrically integral fashion when they are plugged into one another, and wherein projections are integrally formed on the tongues, said projections overhanging outward and securing a spring against axial displacement, said spring gripping the socket in the region of the tongues and providing a radially inwardly directed spring force.

3. A connection system for electrical conductors, in particular insulated cables which are connected to electrical equipment, in particular, components of an electric drive for vehicles, by means of which system at least one plug-and-socket connection can be produced, said plug-and-socket connection being capable of transmitting high currents, said plug-and-socket connection being made from two intermateable contact elements forming a multi-line contact, wherein one of said contact elements comprises a pin and another of said contact elements comprises a socket, and wherein:

the socket has tongues which extend in a socket longitudinal direction, and which are resilient in a radial direction, and which have at least one material part extending in a tongue longitudinal direction and projecting radially inward to provide a line contact, the pin of each plug-and-socket connection is contained in a first electrically insulated housing, and the socket of each plug-and-socket connection is contained in a second electrically insulated housing, the two housings are adapted to plug into one another, and are connected in a fluid-tight and electrically integral fashion when they are plugged into one another, and wherein the housing containing the socket can be inserted into the housing containing the pin over virtually the entire length of the housing containing the pin, the housing containing the socket bearing against the housing containing the pin.

4. A connection system for electrical conductors, in particular insulated cables which are connected to electrical equipment, in particular, components of an electric drive for vehicles, by means of which system at least one plug-and-socket connection can be produced, said plug-and-socket connection being capable of transmitting high currents said plug-and-socket connection being made from two intermateable contact elements forming a multi-line contact, wherein one of said contact elements comprises a pin and another of said contact elements comprises a socket, and wherein:

the socket has tongues which extend in a socket longitudinal direction, and which are resilient in a radial direction, and which have at least one material part extending in a tongue longitudinal direction and projecting radially inward to provide a line contact, the pin of each plug-and-socket connection is contained in a first electrically insulated housing, and the socket of each plug-and-socket connection is contained in a second electrically insulated housing, the two housings are adapted to plug into one another, and are connected in a fluid-tight and electrically integral fashion when they are plugged into one another, and further comprising a cap which overlaps a rear end of one of said housings, said rear end being situated outside another of said housings when the plug-and-socket connection is produced, said cap serving to seal said one of said housings in a fluid-tight and electrically integral fashion with the interposition of a sealing element.

5. The connection system of claim 4, wherein said cap is provided with at least one lug which is flexible in a radial direction, and wherein, when the plug-and-socket connection is produced, said at least one lug is connected at least indirectly to the housing containing the pin.

6. The connection system of claim 4, wherein said rear end of said one housing defines a region which said cap overlaps, and wherein said cap and said region which said cap overlaps each have at least one positioning element, said at least one positioning element of said cap and said at least one positioning element of said region engaging with one another when said cap is completely mounted on said housing containing said socket.

7. A connection system for electrical conductors, in particular insulated cables which are connected to electrical equipment, in particular, components of an electric drive for vehicles, by means of which system at least one plug-and-socket connection can be produced, said plug-and-socket connection being capable of transmitting high currents, said plug-and-socket connection being made from two intermateable contact elements forming a multi-line contact, wherein one of said contact elements comprises a pin and another of said contact elements comprises a socket, and wherein:

the socket has tongues which extend in a socket longitudinal direction, and which are resilient in a radial direction, and which have at least one material part extending in a tongue longitudinal direction and projecting radially inward to provide a line contact, the pin of each plug-and-socket connection is contained in a first electrically insulated housing, and the socket of each plug-and-socket connection is contained in a second electrically insulated housing, the two housings are adapted to plus into one another, and are connected in a fluid-tight and electrically integral fashion when they are plugged into one another, and wherein said housing containing said pin and said housing containing said socket comprise parts of a multi-pole unit.

8. The connection system of claim 7, wherein said multi-pole unit is adapted to be connected in a fluid-tight fashion to an appliance.

9. The connection system of claim 1, wherein said housing containing said pin and said housing containing said socket are provided with cooperating coding elements.

10. The connection system of claim 9, wherein said cooperating coding elements of said housing containing said socket are formed by at least two longitudinal grooves in an outer lateral surface thereof, and said cooperating coding elements of said housing containing said pin are formed by at least two projections.

11. The connection system of claim 1, wherein said housing containing said socket comprises two parts which are connected to one another by a flexible hinge, and which are held together by integrally formed clip elements.

12. The connection system of claim 11, wherein said two parts have integrally formed thereon sealing elements which tightly seal joints thereof.

13. The connection system of claim 1, wherein said housing containing said pin has integrally formed thereon arms which are radially resilient and which lie in an identical radial plane for engaging an annular groove of said pin.

14. The connection system of claim 1, wherein said housing containing said pin includes a mounting flange.

15. The connection system of claim 14, wherein said housing containing said pin and said housing containing said socket are provided on a single mounting flange.

16. The connection system of claim 14, further comprising at least one connecting flange formed from metal and overlapping said mounting flange, said at least one connecting flange being adapted for connection of a cable screen thereto.

* * * * *

UNITED STATES PATENT AND TRADEMARK OFFICE
CERTIFICATE OF CORRECTION

PATENT NO. : 5,916,002
DATED : June 29, 1999
INVENTOR(S) : Gottschalk et al.

It is certified that error appears in the above-indentified patent and that said Letters Patent is hereby corrected as shown below:

```
Title page, item    [73], change

"Karl Pfister Elektrorechnische" to

--Karl Pfisterer Elektrotechnische--
```

Signed and Sealed this

Ninth Day of November, 1999

Attest:

Q. TODD DICKINSON

*Attesting Officer*     *Acting Commissioner of Patents and Trademarks*